US012780427B2

(12) United States Patent
Carle et al.

(10) Patent No.: US 12,780,427 B2
(45) Date of Patent: Nov. 3, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/371,692

(22) Filed: Oct. 28, 2025

(65) Prior Publication Data

US 2026/0145798 A1 May 28, 2026

Related U.S. Application Data

(63) Continuation-in-part of application No. PCT/US2024/040754, filed on Aug. 2, 2024, which is (Continued)

(51) Int. Cl.
*B64D 27/12* (2006.01)
*B64C 7/00* (2006.01)
*B64C 11/48* (2006.01)

(52) U.S. Cl.
CPC ................ *B64D 27/12* (2013.01); *B64C 7/00* (2013.01); *B64C 11/48* (2013.01)

(58) Field of Classification Search
CPC ....... B64D 27/12; B64C 11/305; B64C 11/48; F01D 5/022
See application file for complete search history.

(56) References Cited

U.S. PATENT DOCUMENTS 2,581,625 A 1/1952 Brady
2,929,586 A 3/1960 Hurd, Jr.
(Continued)

FOREIGN PATENT DOCUMENTS

CN 107140238 9/2017
FR 3129428 A1 5/2023
(Continued)

OTHER PUBLICATIONS

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.
(Continued)

*Primary Examiner* — Joshua J Michener
*Assistant Examiner* — Cindi M Curry
(74) *Attorney, Agent, or Firm* — FITCH, EVEN, TABIN & FLANNERY, LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

20 Claims, 24 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(56) References Cited

U.S. PATENT DOCUMENTS

| | | | | |
|---|---|---|---|---|
| 4,534,526 | A | 8/1985 | Metzger | |
| 4,815,995 | A | 3/1989 | Ingvason | |
| 4,917,336 | A | 4/1990 | Jacobs | |
| 4,934,825 | A | 6/1990 | Martin | |
| 4,976,102 | A | 12/1990 | Taylor | |
| 5,079,916 | A | 1/1992 | Johnson | |
| 5,135,185 | A | 8/1992 | Adamson | |
| 5,136,185 | A | 8/1992 | Fleming | |
| 5,148,402 | A | 9/1992 | Magliozzi | |
| 5,156,353 | A | 10/1992 | Gliebe | |
| 5,190,441 | A | 3/1993 | Murphy | |
| 5,197,855 | A | 3/1993 | Magliozzi | |
| 5,789,678 | A | 8/1998 | Pla | |
| 6,341,747 | B1 | 1/2002 | Schmidt | |
| 7,578,132 | B2 | 8/2009 | Webster | |
| 8,011,613 | B2 | 9/2011 | Belleville | |
| 8,056,862 | B1 | 11/2011 | Tomerlin | |
| 8,083,482 | B2 | 12/2011 | Serven | |
| 8,087,607 | B2 | 1/2012 | Moore | |
| 8,177,170 | B2 | 5/2012 | Fol | |
| 8,186,617 | B2 | 5/2012 | Llamas Sandin | |
| 8,196,860 | B2 | 6/2012 | Gall | |
| 8,210,798 | B2 | 7/2012 | Stern | |
| 8,220,586 | B2 | 7/2012 | Todorovic | |
| 8,240,609 | B2 | 8/2012 | Parazzoli | |
| 8,350,398 | B2 | 1/2013 | Butt | |
| 8,550,397 | B2 | 10/2013 | Verde Preckler | |
| 8,678,314 | B2 | 3/2014 | Martino Gonzalez | |
| 8,690,106 | B1 | 4/2014 | Reissig | |
| 8,714,475 | B2 | 5/2014 | Gall | |
| 8,967,967 | B2 | 3/2015 | Stretton | |
| 9,057,329 | B2 | 6/2015 | Weir | |
| 9,102,397 | B2 | 8/2015 | Wood | |
| 9,242,721 | B2 | 1/2016 | Neuteboom | |
| 9,527,578 | B2 | 12/2016 | Towkan | |
| 9,540,094 | B2 | 1/2017 | Negulescu | |
| 9,567,090 | B2 | 2/2017 | Gallet | |
| 9,630,702 | B2 | 4/2017 | Alonso-Miralles | |
| 9,725,155 | B2 | 8/2017 | Miller | |
| 9,745,051 | B2 | 8/2017 | Tantot | |
| 9,758,254 | B2 | 9/2017 | Moore | |
| 9,759,160 | B2 | 9/2017 | Sankrithi | |
| 9,856,745 | B2 | 1/2018 | Ali | |
| 9,890,657 | B2 | 2/2018 | Ali | |
| 10,040,559 | B2 | 8/2018 | Hoisington | |
| 10,118,710 | B2 | 11/2018 | Derrez | |
| 10,131,441 | B2 | 11/2018 | Edwards | |
| 10,202,865 | B2 | 2/2019 | Breeze-Stringfellow | |
| 10,370,086 | B2 | 8/2019 | Vion | |
| 10,378,452 | B1 | 8/2019 | Barmichev | |
| 10,399,664 | B2 | 9/2019 | Bowden | |
| 10,414,486 | B2 | 9/2019 | Wood | |
| 10,414,497 | B2 | 9/2019 | Vélez De mendizábal Alonso | |
| 10,442,541 | B2 | 10/2019 | Miller | |
| 10,669,881 | B2 | 6/2020 | Breeze-Stringfellow | |
| 10,907,495 | B2 | 2/2021 | Breeze-Stringfellow | |
| 11,136,109 | B2 | 10/2021 | Wood | |
| 11,814,174 | B2 | 11/2023 | Crall | |
| 12,000,344 | B2 | 6/2024 | Levisse | |
| 12,103,702 | B2 | 10/2024 | Crall | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,359,588 | B1 * | 7/2025 | Khalid | F01D 21/003 |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2008/0245925 | A1 | 10/2008 | Udall | |
| 2009/0184206 | A1 | 7/2009 | Lin | |
| 2012/0119023 | A1 | 5/2012 | Moore | |
| 2012/0195739 | A1 | 8/2012 | Kingan | |
| 2013/0115083 | A1 | 5/2013 | Vuillemin | |
| 2014/0248116 | A1 | 9/2014 | Ali | |
| 2014/0374566 | A1 | 12/2014 | Fernando | |
| 2015/0344127 | A1 | 12/2015 | Wood | |
| 2016/0333729 | A1 | 11/2016 | Miller | |
| 2016/0368592 | A1 | 12/2016 | Szymandera | |
| 2017/0002688 | A1 | 1/2017 | Beutin | |
| 2017/0159571 | A1 | 6/2017 | Sidelkovskiy | |
| 2017/0225773 | A1 | 8/2017 | Wood | |
| 2018/0065727 | A1 | 3/2018 | Gruber | |
| 2018/0079492 | A1 | 3/2018 | Seidel | |
| 2018/0127084 | A1 | 5/2018 | Tajan | |
| 2018/0354634 | A1 | 12/2018 | Jodet | |
| 2018/0362170 | A1 * | 12/2018 | Stuart | B64D 27/12 |
| 2019/0185170 | A1 | 6/2019 | Schelfaut | |
| 2021/0221491 | A1 | 7/2021 | Crall | |
| 2022/0266979 | A1 | 8/2022 | Bansal | |
| 2023/0021836 | A1 | 1/2023 | Riddle | |
| 2024/0410319 | A1 | 12/2024 | Becoulet | |
| 2025/0018895 | A1 | 1/2025 | Howell | |
| 2025/0042537 | A1 | 2/2025 | Carle | |
| 2025/0042538 | A1 | 2/2025 | Carle | |
| 2025/0042558 | A1 | 2/2025 | Carle | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| FR | 3129436 | A1 | 5/2023 |
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |

OTHER PUBLICATIONS

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb.-Mar. 2016 Issue (Oct. 26, 2017); https://www.armadainternational.com/2017/10/airbus-a400m-strategic-turboprop-freighter-programme/; 9 pgs.

Carney et al., Weight Assessment for Fuselage Shielding on Aircraft With Open-Rotor Engines and Composite Blade Loss, NASA/TM-2013-216582, 2013, 33 Pages.

Gazzaniga et al., Wind Tunnel Performance Results of Swiri Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 (MDM.092) Dec. 21, 2015., 96 Pages.

* cited by examiner

AIRCRAFT WITH AN UNDUCTED FAN PROPULSOR

CROSS-REFERENCE TO RELATED APPLICATIONS

This application is a continuation of International Appl. No. PCT/US2024/040754, filed Aug. 2, 2024, which claims priority to U.S. patent application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties.

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The word "exemplary" is used herein to mean "serving as an example, instance, or illustration." Any implementation described herein as "exemplary" is not necessarily to be construed as preferred or advantageous over other implementations.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

Figure 6A:
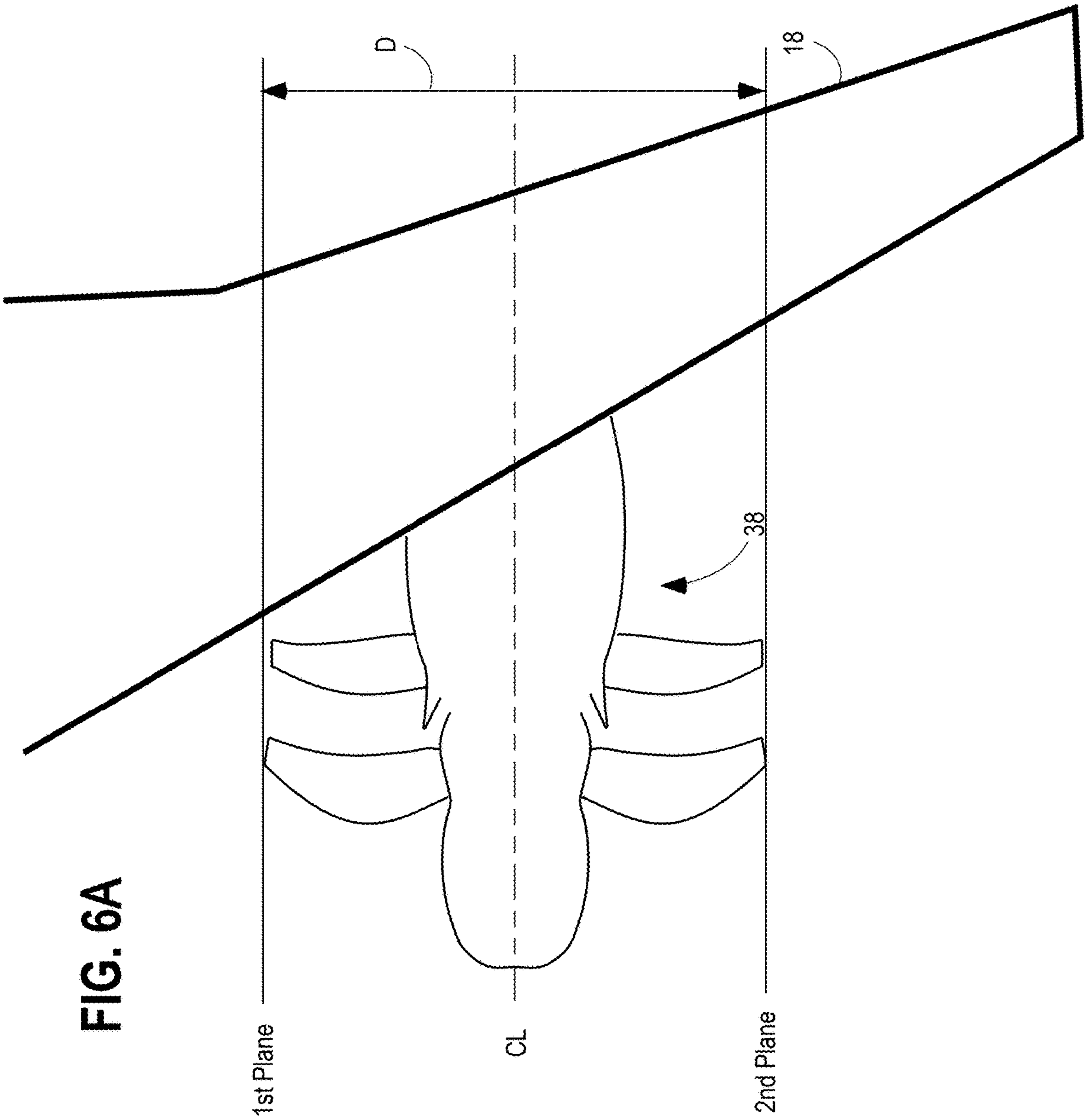
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
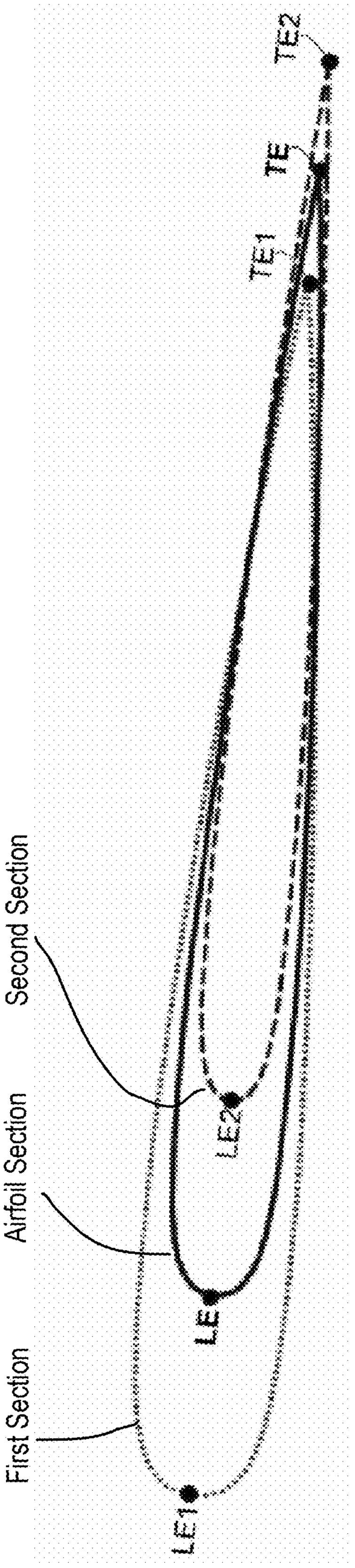
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

Figure 3:
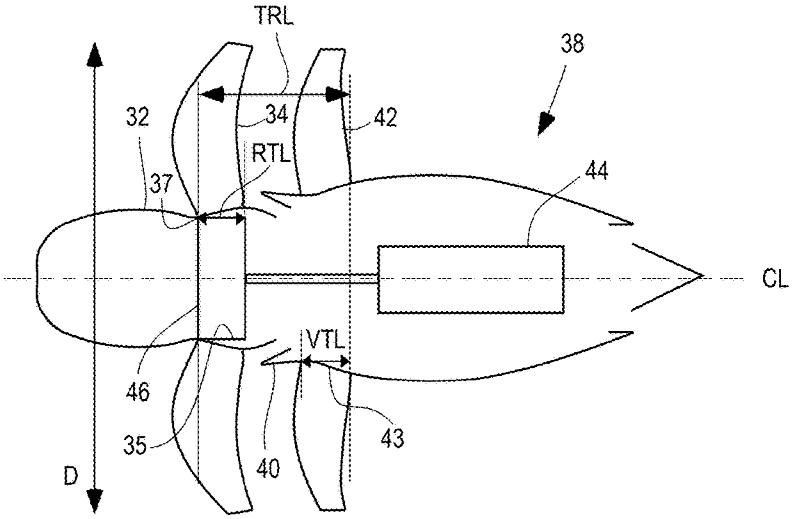
FIG. 3 comprises an elevational cross-sectional view of an exemplary unducted fan propulsor having a plurality of blades arranged in a forward array and a rearward array.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIG. 3 depicts an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
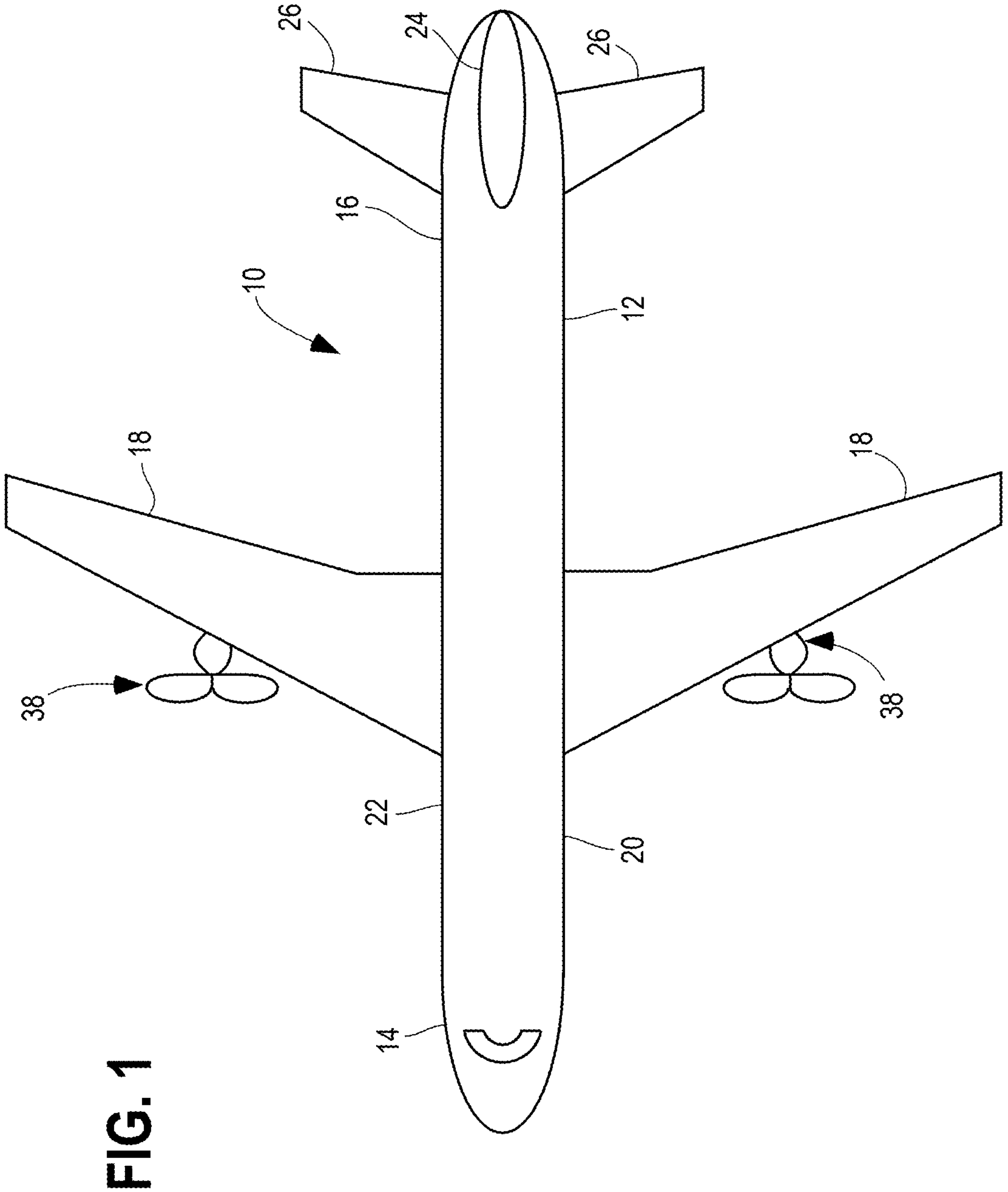
FIG. 1 comprises a top plan view of an aircraft as configured in accordance with various embodiments of these teachings, with undermounted, unducted fan propulsors mounted on forward wings of the aircraft.
Figure 2:
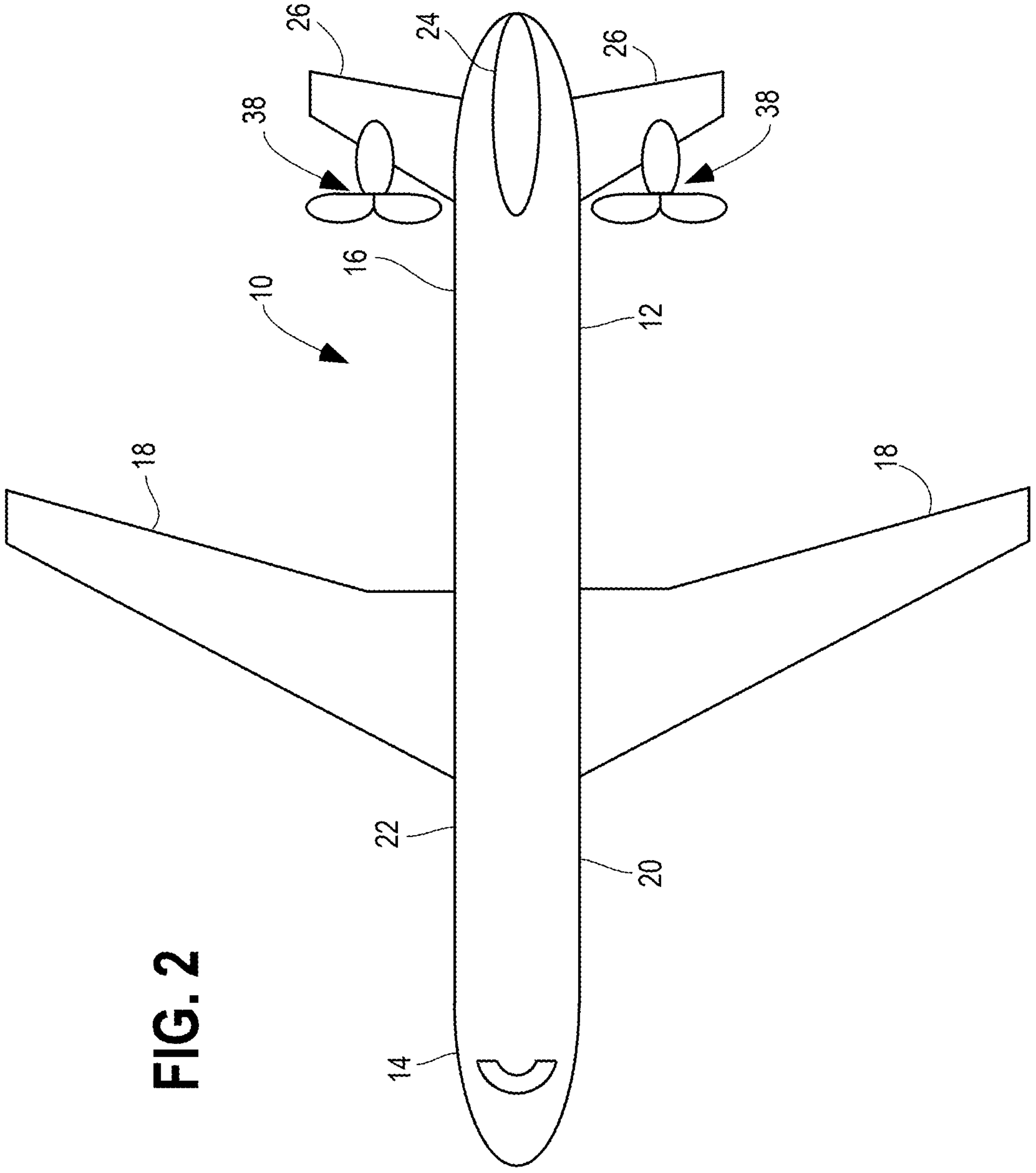
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
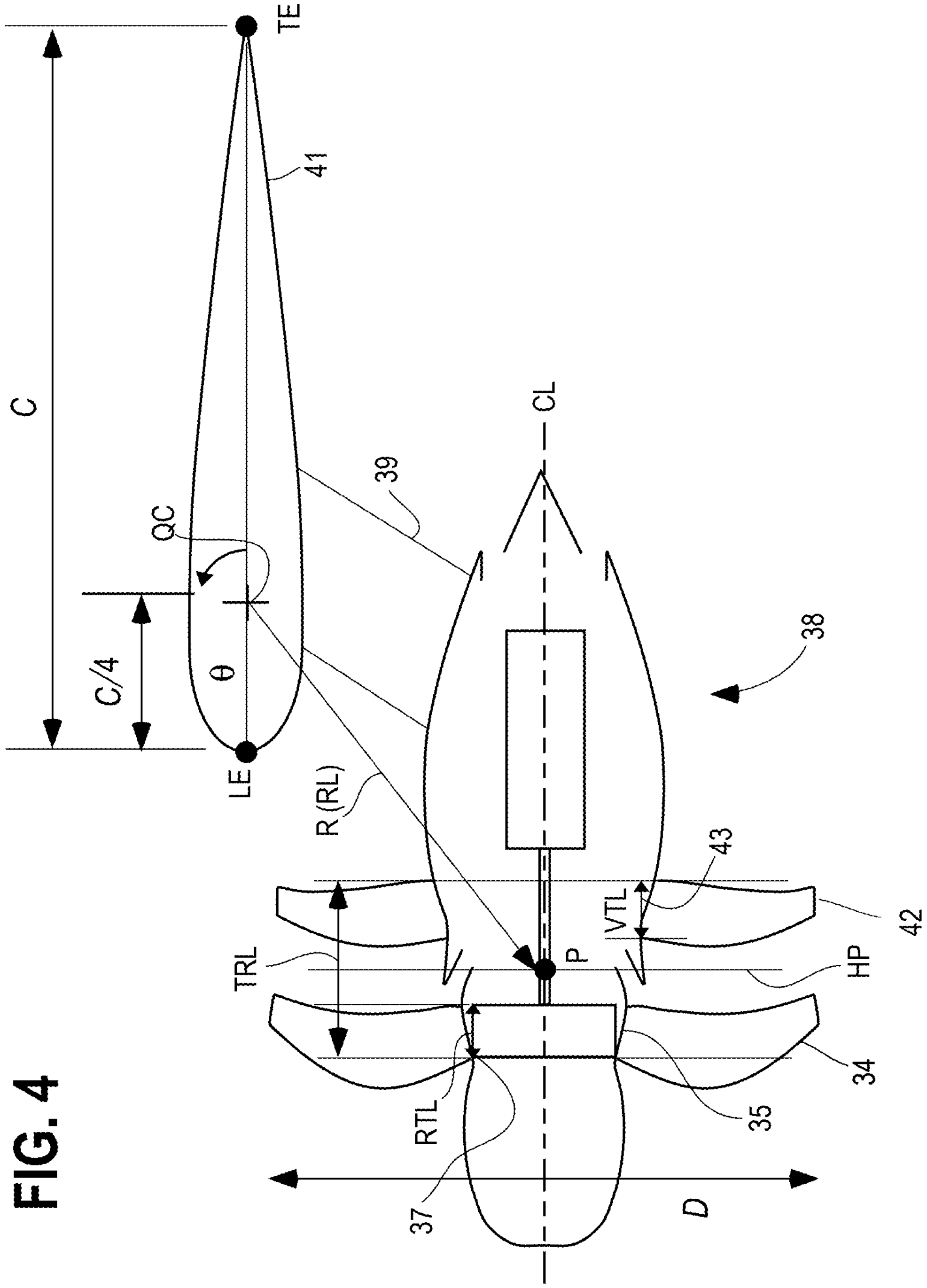
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

It will be appreciated that in certain exemplary embodiments, the rotating blades may be formed substantially of a composite material (i.e., at least 60% of the airfoil sections of the respective rotating blades may be the composite material). The composite material may be a ceramic matrix composite material, commonly referred to as "CMC".

Referring to FIG. 4, for purposes explained more later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5B:
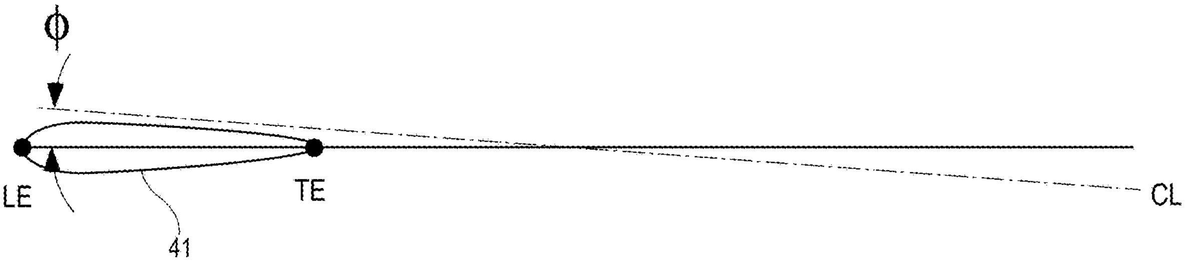
FIG. 5B defines a pitch angle Φ for the unducted fan propulsor relative to a chord line of the airfoil section in FIG. 4.
Figure 5A:
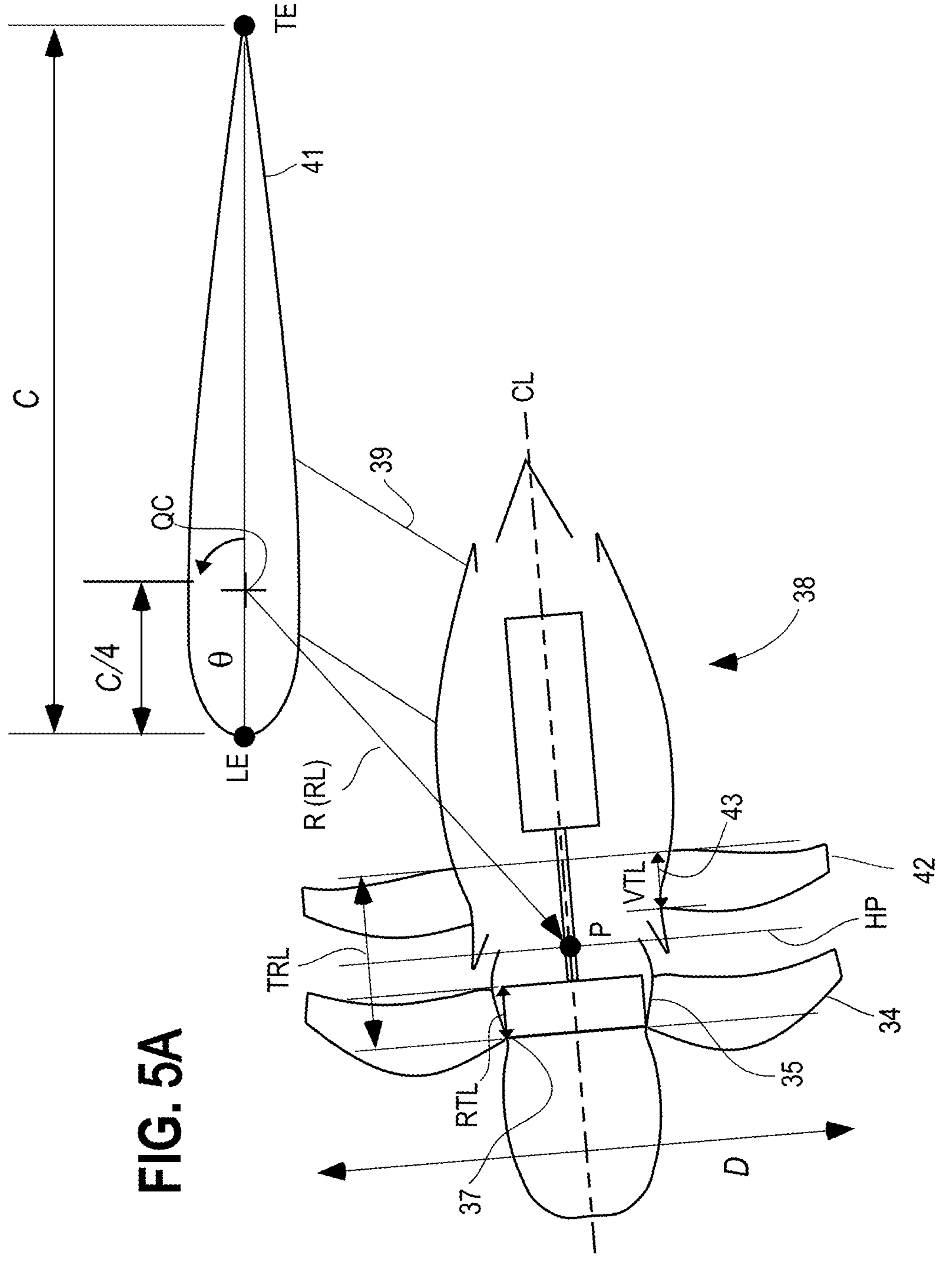
FIG. 5A is a schematic side elevation view similar to FIG. 4 and showing the unducted fan propulsor pitched downward relative to the airfoil section.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
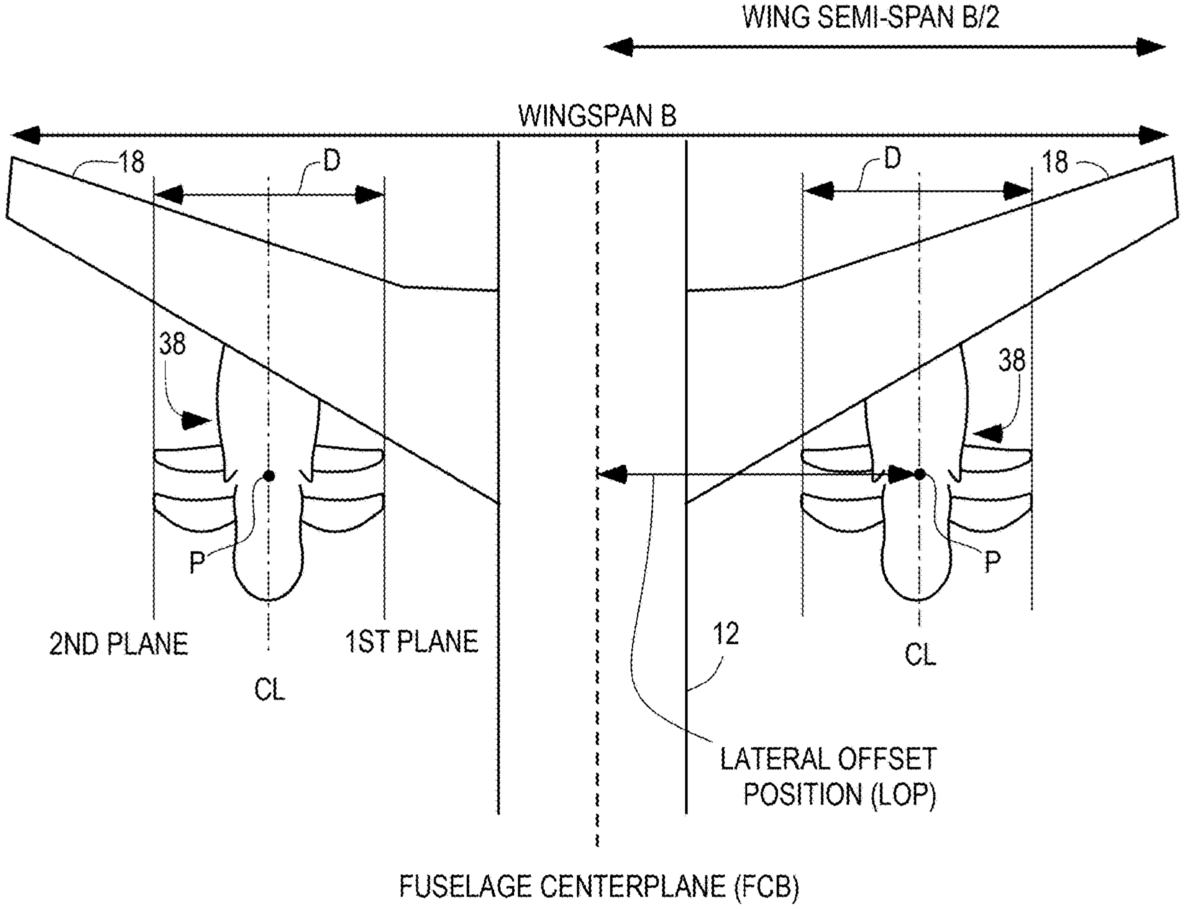
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
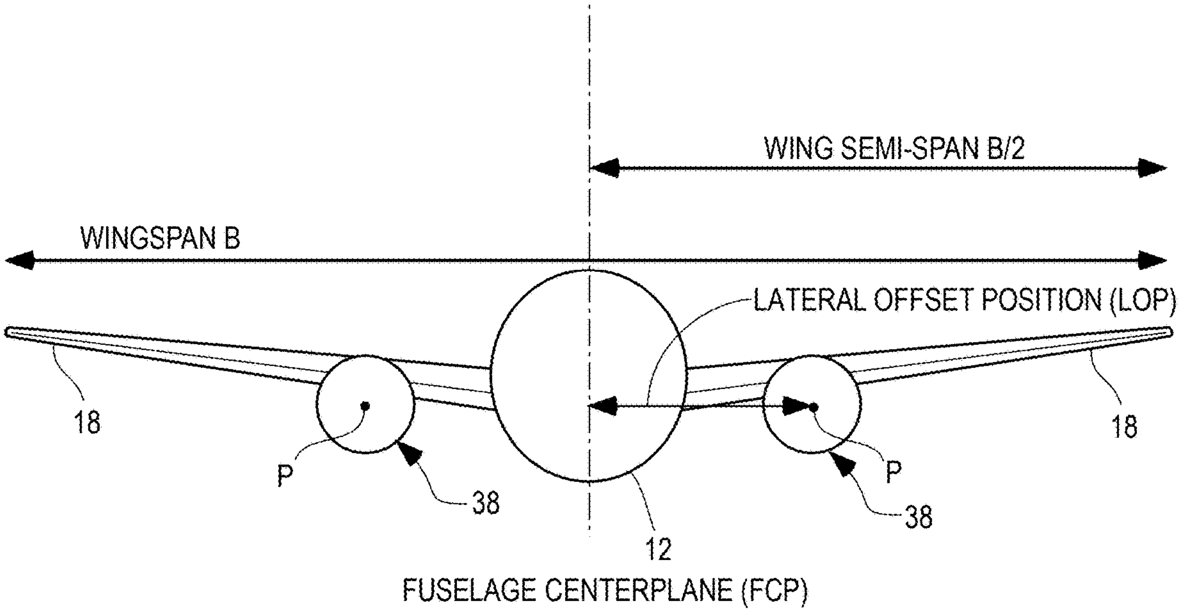
FIG. 6D comprises a schematic front elevation view of the aircraft portion of FIG. 6C.
Figure 6E:
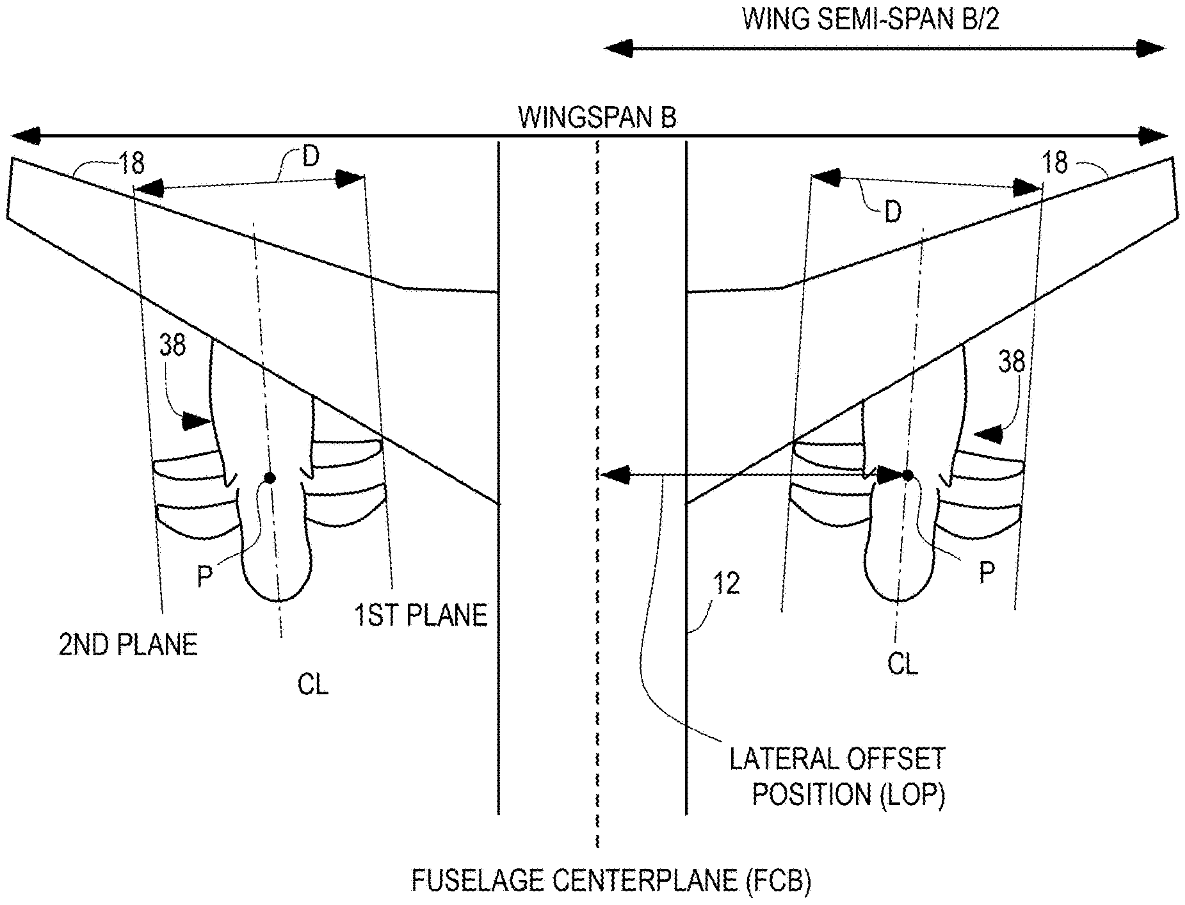
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counterclockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
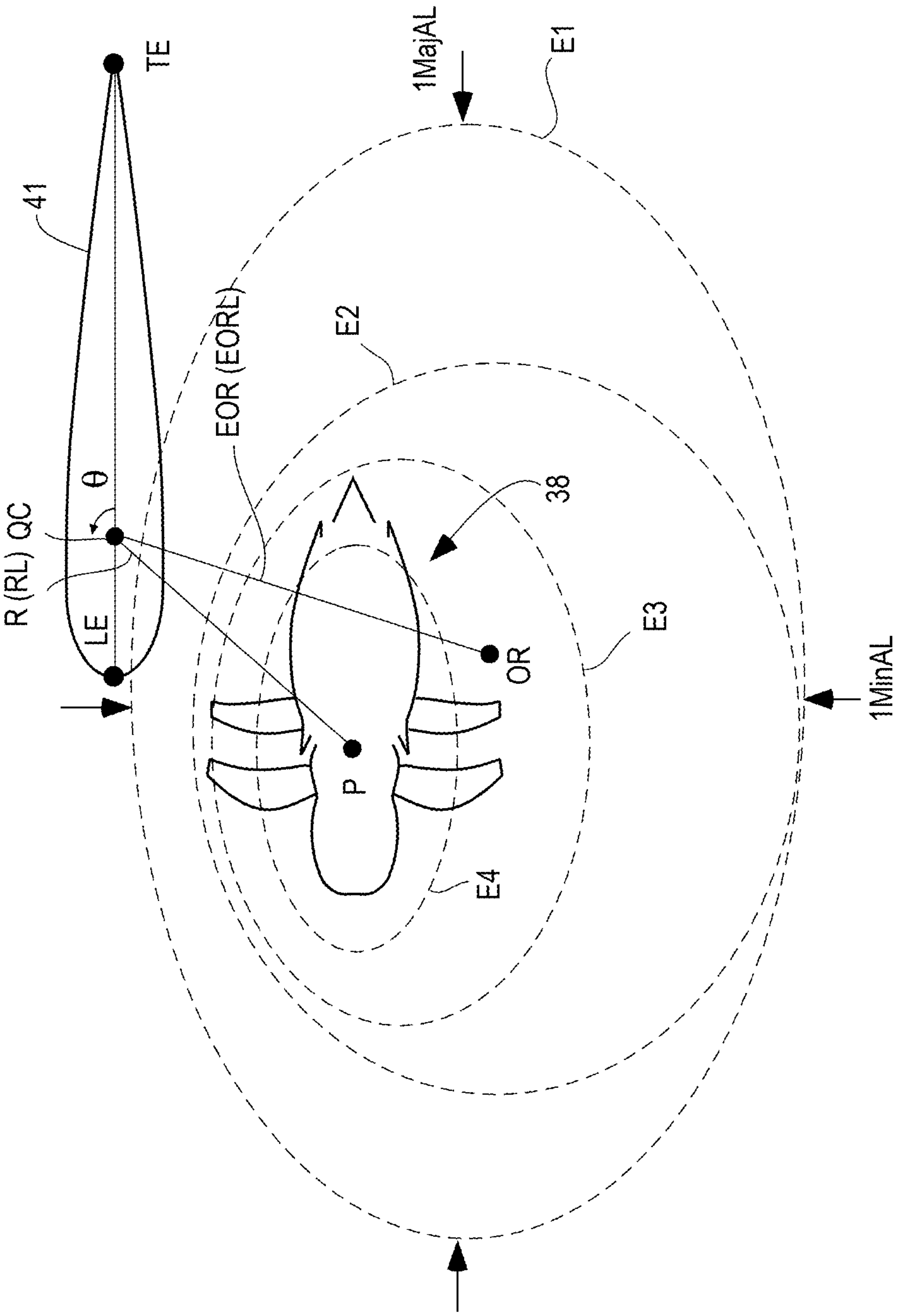
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
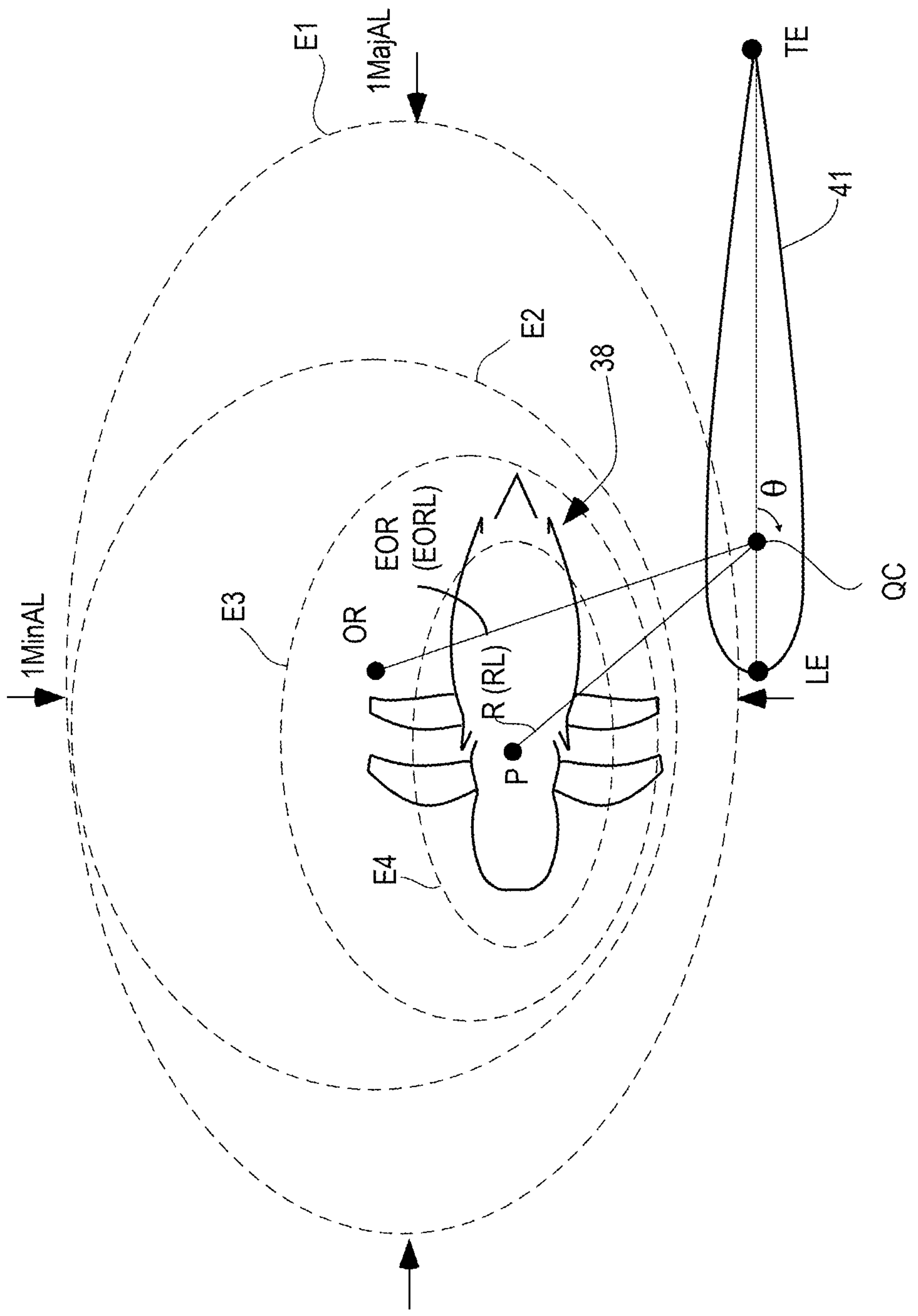
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1 MajAL) and a first minor axis length (1 MinAL), where 1 MajAL/D is 2.8 and 1 MinAL/D is 1.7. An unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2 MajAL) and a second minor axis length (2 MinAL), where 2 MajAL/D is 1.86 and 2 MinAL/D is 1.56. An unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3 MajAL) and a third minor axis length (3 MinAL), where 3 MajAL/D is 1.4 and 3 MinAL/D is 0.9. An unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4 MajAL) and a fourth minor axis length (4 MinAL), where 4 MajAL/D is 0.94 and 4 MinAL/D is 0.44. An unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D} + \frac{\left(\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} > 0$$

and $$\frac{RL}{D} + \frac{\left(-\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} < 0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and θ is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and θ is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and θ is between 211° and 274°, And where a, b, c, d, e, f, g and h have the values set forth in the above table under the heading "Eighth Emb."

Figure 7:
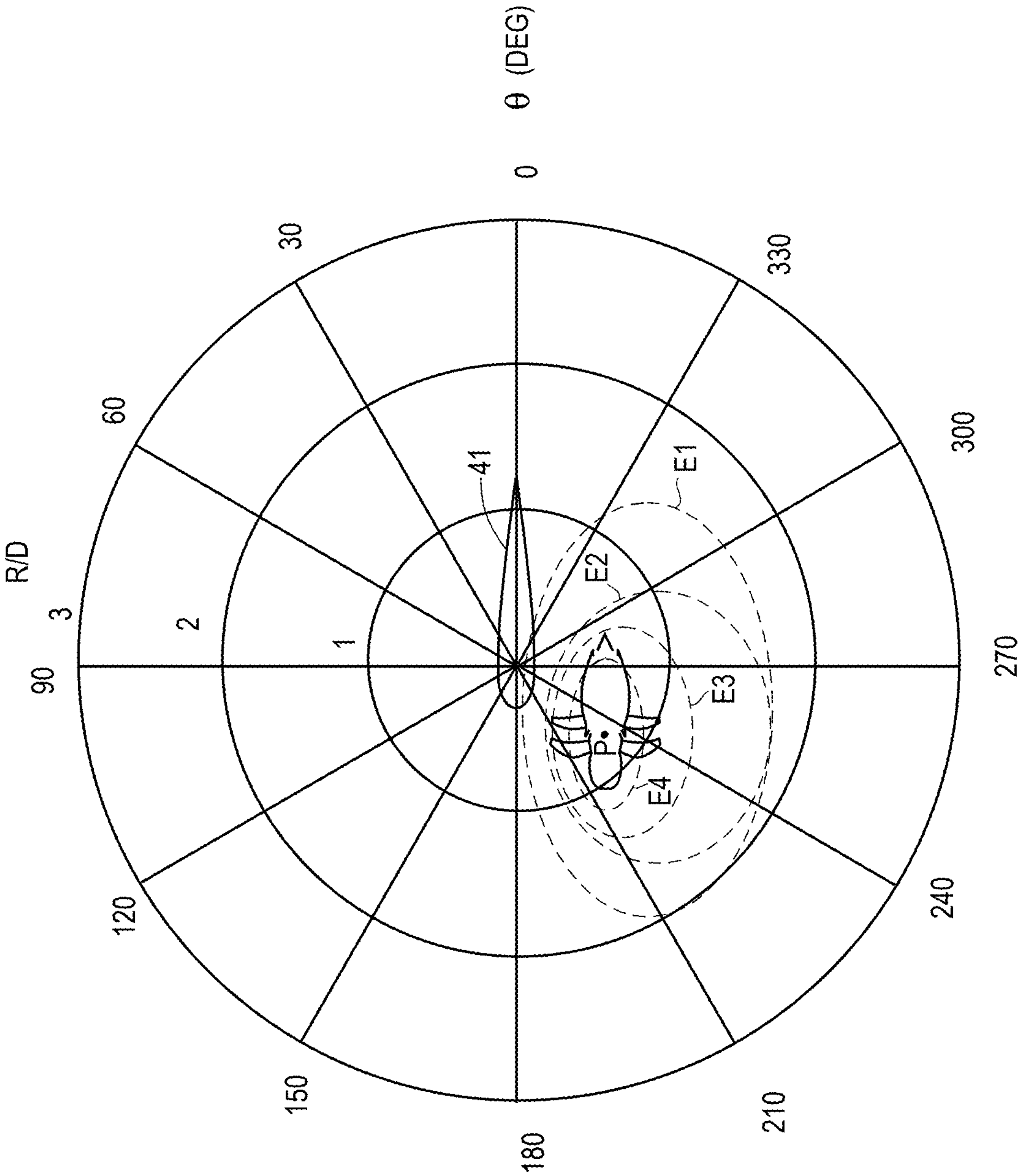
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
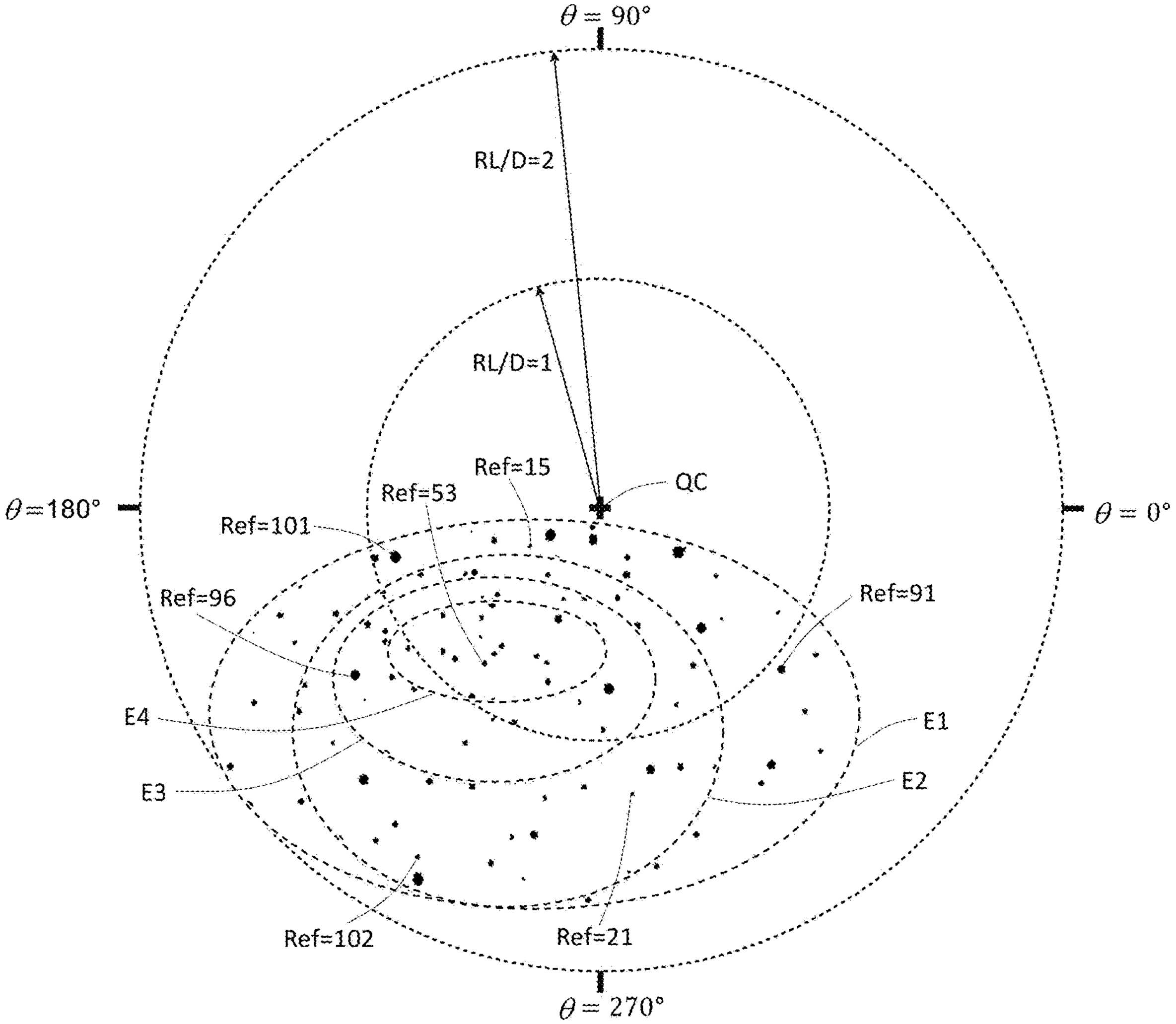
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2-50, 8-16, 10-15, 12-14, or 14-16 feet.

TABLE 1

| P-location relative to airfoil section quarter chord point | | | | | |
|---|---|---|---|---|---|
| Ref. | Type of aircraft | RL | D | θ (deg) | RL/D |
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |

TABLE 1-continued

| P-location relative to airfoil section quarter chord point | | | | | |
|---|---|---|---|---|---|
| Ref. | Type of aircraft | RL | D | θ (deg) | RL/D |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |

TABLE 1-continued

| P-location relative to airfoil section quarter chord point | | | | | |
|---|---|---|---|---|---|
| Ref. | Type of aircraft | RL | D | θ (deg) | RL/D |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |

TABLE 3-continued

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |

TABLE 5-continued

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
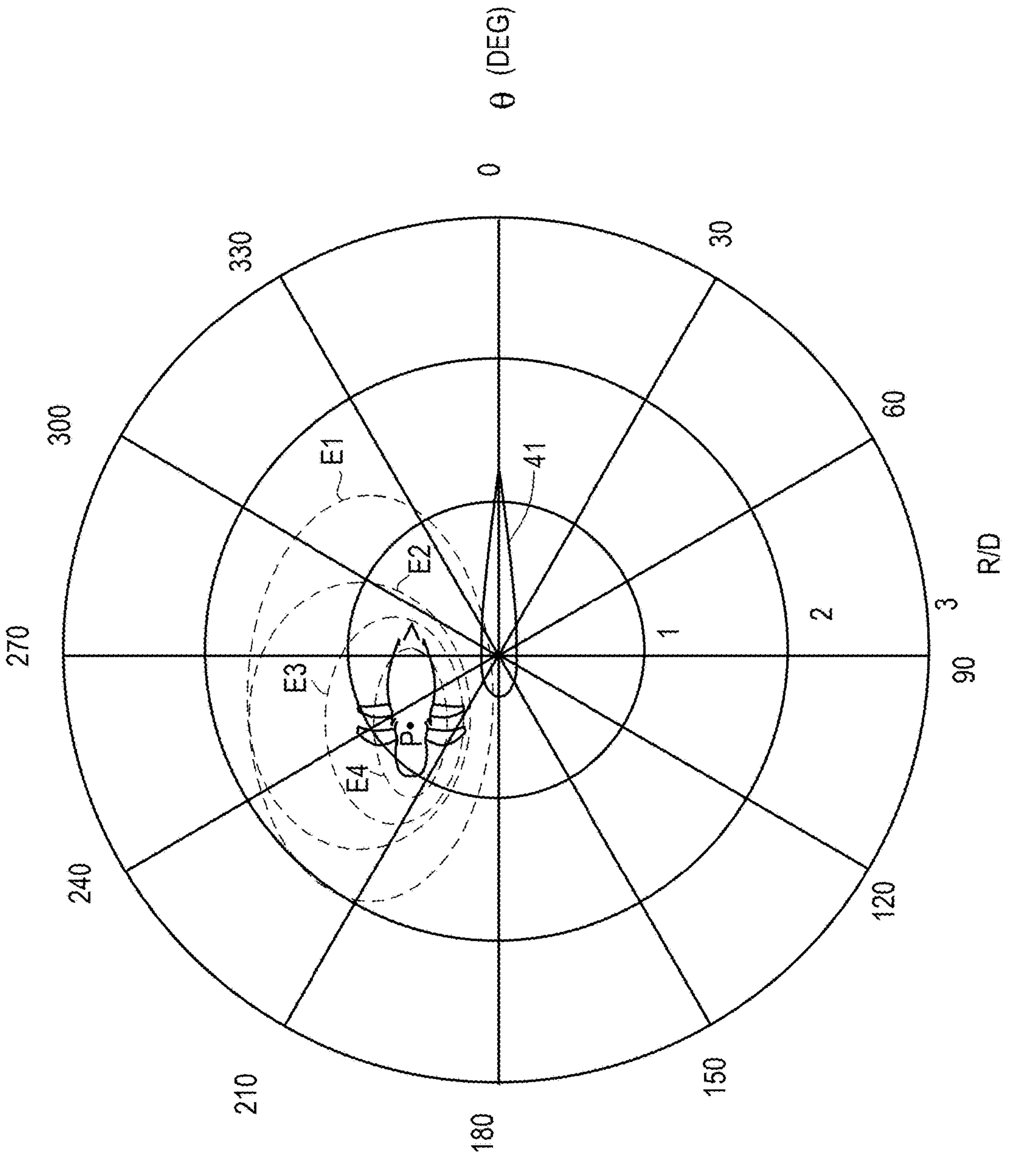
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

In certain aspects of the present disclosure, an aircraft may include a fuselage shield. The fuselage shield is attached to or formed integrally with the fuselage at a location aligned with a stage of unducted rotor blades of an unducted fan propulsor. This shield is designed to provide protection for the fuselage in the event of a blade loss from the unducted fan propulsor. The shield may be constructed with a variety of materials to, e.g., absorb energy, spread loads, etc.; may be constructed with multiple layers and include different zones of varying impact resistance to improve protection while managing weight; may be removable from the aircraft to allow for changing out the fuselage shield in between flight operations; or combinations thereof.

The incorporation of a fuselage shield provides complementary benefits when combined with the specific unducted fan propulsor placement described previously. The above disclosure directed to positioning the propulsor relative to the airfoil aims to improve aerodynamic performance and offset installation drag effects. This makes the use of large-diameter unducted propulsors an attractive option for improving the fuel efficiency of an aircraft. However, the absence of a nacelle around the rotor blades of an unducted engine removes a traditional means of containment in a blade-out event.

Moreover, the improved aerodynamic positioning of the unducted propulsor, while improving efficiency, may also subject the fan blades to a higher pressure field and increased aerodynamic distortion. This more demanding environment may require the use of more structurally robust fan blades, which may, in turn, have an increased mass. An uncontained blade failure involving such a fan blade would therefore have a higher kinetic energy. Accordingly, inclusion of a fuselage shield, as provided hereinbelow, having a non-uniform configuration, e.g., with zones of increased capability, which can be strategically targeted to the areas most likely to contact the fan blades, would allow for a desired protection while minimizing an overall weight of the fuselage shield and helping to preserve the efficiency benefits of the unducted propulsor.

In particular, the fuselage shield of the present disclosure provides a dedicated protective structure on the fuselage, such that a potential risk associated with an uncontained blade failure can be mitigated, and combining the aerodynamically efficient propulsor placement with the fuselage shield allows for a more comprehensive and practical aircraft design. The performance advantages of the improved propulsor location can be leveraged while simultaneously addressing a structural integrity requirement of the airframe.

Furthermore, the design parameters of the two technologies are interrelated. The specific location and fan diameter (D) of the propulsor, as determined by the relationships for aerodynamic efficiency, directly inform the required design of the fuselage shield. A position, angle, surface area coverage, and length along the fuselage of the fuselage shield are all informed by the location of a plane of rotation of the unducted propulsor.

The combination of these technologies enables successful integration of high-efficiency unducted propulsors on aircraft, including narrow-body and wide-body commercial aircraft where both performance and safety are a primary design drivers. The synergistic result is an aircraft propulsion system that is not only designed for aerodynamic efficiency through its placement but is also designed with a robust, integrated safety feature to protect the airframe.

Figure 12:
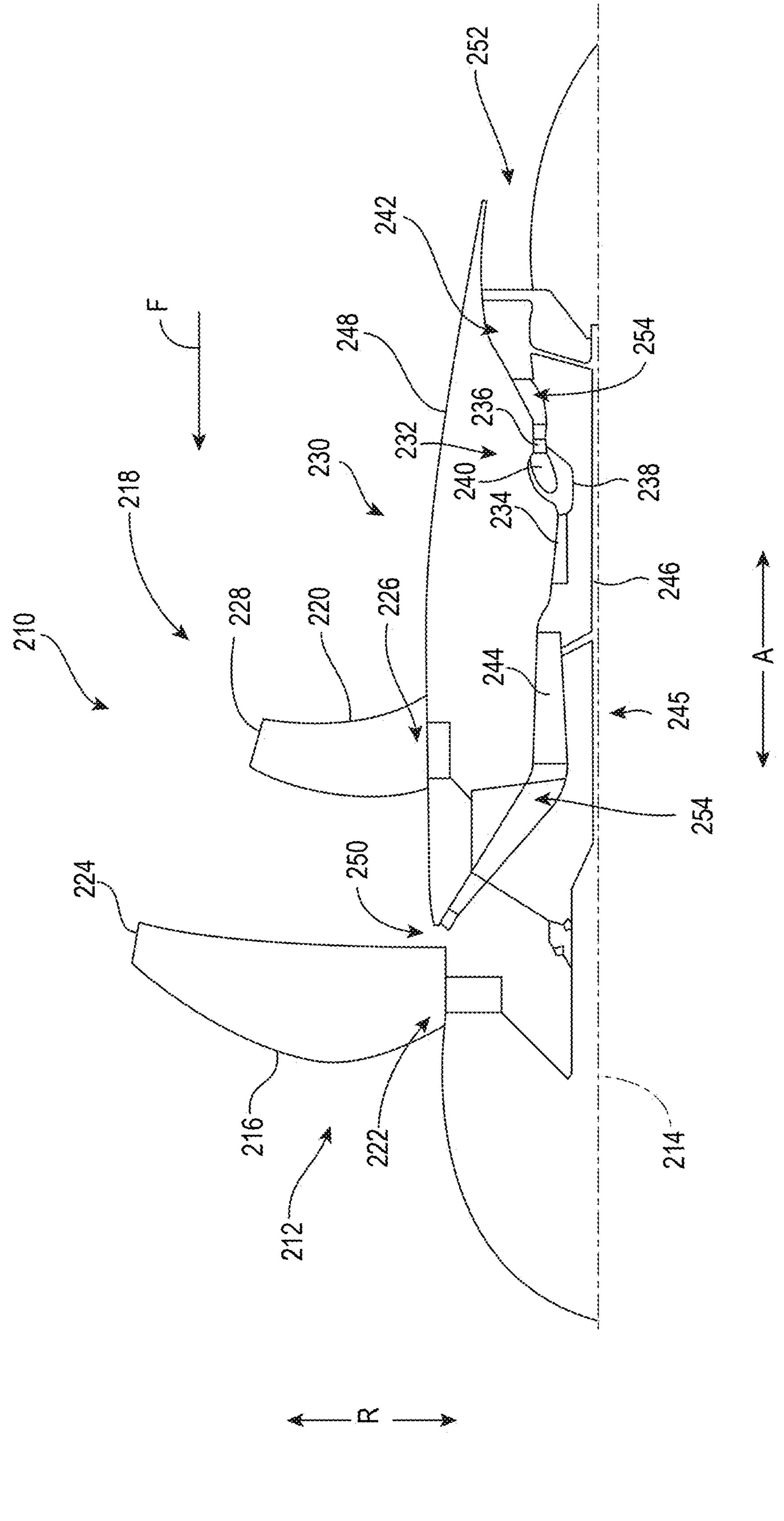
FIG. 12 is a schematic, cross-sectional view of a gas turbine engine in accordance with an exemplary aspect of the present disclosure.

Referring now back to the Figures, FIG. 12 shows an elevational cross-sectional view of an exemplary embodiment of a gas turbine engine as may incorporate one or more inventive aspects of the present disclosure. In particular, the exemplary gas turbine engine of FIG. 12 is a configured as a unducted fan propulsor 210 defining an axial direction A, a radial direction R, and a circumferential direction C (see, e.g., FIG. 13, extending about the axial direction A). As is seen from FIG. 12, the unducted fan propulsor 210 takes the form of an open rotor propulsion system and has a rotor assembly 212 which includes an array of airfoils arranged around a central longitudinal axis 214 of unducted fan propulsor 210, and more particularly includes an array of blades 216 arranged around the central longitudinal axis 214 of unducted fan propulsor 210. The blades 216 (also referred to hereinabove as rotating blades) may, in certain exemplary embodiments, be formed substantially of a composite material (i.e., at least 60% of an airfoil section of each blade 216 may be the composite material). The composite material may be a ceramic matrix composite material, commonly referred to as “CMC”.

Moreover, as will be explained in more detail below, the unducted fan propulsor 210 additionally includes a non-rotating vane assembly 218 positioned aft of the rotor assembly 212 (i.e., non-rotating with respect to the central axis 214), which includes an array of airfoils also disposed around central axis 214, and more particularly includes an array of vanes 220 disposed around central axis 214. The blades 216 are arranged in typically equally spaced relation around the centerline 214, and each blade has a root 222 and a tip 224 and a span defined therebetween. It is noted that the vanes 220 each have a root 226 and a tip 228 and a span defined therebetween. The rotor assembly 212 further includes a hub 245 located forward of the plurality of blades 216.

Additionally, the unducted fan propulsor 210 includes a turbomachine 230 having core (or high speed system) 232 and a low speed system. The core 232 generally includes a high-speed compressor 234, a high speed turbine 236, and a high speed shaft 238 extending therebetween and connecting the high speed compressor 234 and high speed turbine 236. The high speed compressor 234 (or at least the rotating components thereof), the high speed turbine 236 (or at least the rotating components thereof), and the high speed shaft 238 may collectively be referred to as a high speed spool 235 of the engine. Further, a combustion section 240 is located between the high speed compressor 234 and high speed turbine 236. The combustion section 240 may include one or more configurations for receiving a mixture of fuel and air, and providing a flow of combustion gasses through the high speed turbine 236 for driving the high speed spool 235.

The low speed system similarly includes a low speed turbine 242, a low speed compressor or booster 244, and a low speed shaft 246 extending between and connecting the low speed compressor 244 and low speed turbine 242.

Although the unducted fan propulsor 210 is depicted with the low speed compressor 244 positioned forward of the high speed compressor 234, in certain embodiments the compressors 234, 244 may be in an interdigitated arrangement. Additionally, or alternatively, although the unducted fan propulsor 210 is depicted with the high speed turbine 236 positioned forward of the low speed turbine 242, in certain embodiments the turbines 236, 242 may similarly be in an interdigitated arrangement.

Referring still to FIG. 12, the turbomachine 230 is generally encased in a cowl 248. Moreover, it will be appreciated that the cowl 248 defines at least in part an inlet 250 and an exhaust 252, and includes a turbomachinery flowpath 254 extending between the inlet 250 and the exhaust 252. The inlet 250 is for the exemplary embodiment depicted an annular or axisymmetric 360 degree inlet 250 located between the rotor blade assembly 212 and the fixed or stationary vane assembly 218, and provides a path for incoming atmospheric air to enter the turbomachinery flowpath 254 (and compressors 244, 234, combustion section 240, and turbines 236, 242) inwardly of the guide vanes 220 along the radial direction R. Such a location may be advantageous for a variety of reasons, including management of icing performance as well as protecting the inlet 250 from various objects and materials as may be encountered in operation.

However, in other embodiments, the inlet 250 may be positioned at any other suitable location, e.g., aft of the vane assembly 218, arranged in a non-axisymmetric manner, etc.

As briefly mentioned above the unducted fan propulsor 210 includes a vane assembly 218. The vane assembly 218 extends from the cowl 248 and is positioned aft of the rotor assembly 212. The vanes 220 of the vane assembly 218 may be mounted to a stationary frame or other mounting structure and do not rotate relative to the central axis 214. For reference purposes, FIG. 12 also depicts the forward direction with arrow F, which in turn defines the forward and aft portions of the system. As shown in FIG. 12, the rotor assembly 212 is located forward of the turbomachine 230 in a “puller” configuration, and the exhaust 252 is located aft of the guide vanes 220. As will be appreciated, the vanes 220 of the vane assembly 218 may be configured for straightening out an airflow (e.g., reducing a swirl in the airflow) from the rotor assembly 212 to increase an efficiency of the unducted fan propulsor 210. For example, the vanes 220 may be sized, shaped, and configured to impart a counteracting swirl to the airflow from the blades 216 so that in a downstream direction aft of both rows of airfoils (e.g., blades 216, vanes 220) the airflow has a greatly reduced degree of swirl, which may translate to an increased level of induced efficiency. Further discussion regarding the vane assembly 218 is provided below.

Referring still to FIG. 12, it may be desirable that the blades 216, the vanes 220, or both, incorporate a pitch change mechanism such that the airfoils (e.g., blades 216, vanes 220, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the blades 216, or to provide a thrust reversing feature which may be useful in certain operating conditions such as upon landing an aircraft, or to desirably adjust acoustic noise produced at least in part by the blades 216, the vanes 220, or aerodynamic interactions from the blades 216 relative to the vanes 220.

As is depicted, the rotor assembly 212 is driven by the turbomachine 230, and more specifically, is driven by the low speed spool 245. In such a manner, the rotating blades 216 of the rotor assembly 212 may rotate around the axis 214 and generate thrust to propel unducted fan propulsor 210, and hence an aircraft to which it is associated, in a forward direction F.

It is noted, however, that the exemplary single rotor unducted fan propulsor 210 depicted in FIG. 12 is by way of example only, and that in other exemplary embodiments, the unducted fan propulsor 210 may have any other suitable configuration, including, for example, any other suitable number of shafts or spools, turbines, compressors, etc.

Figure 13:
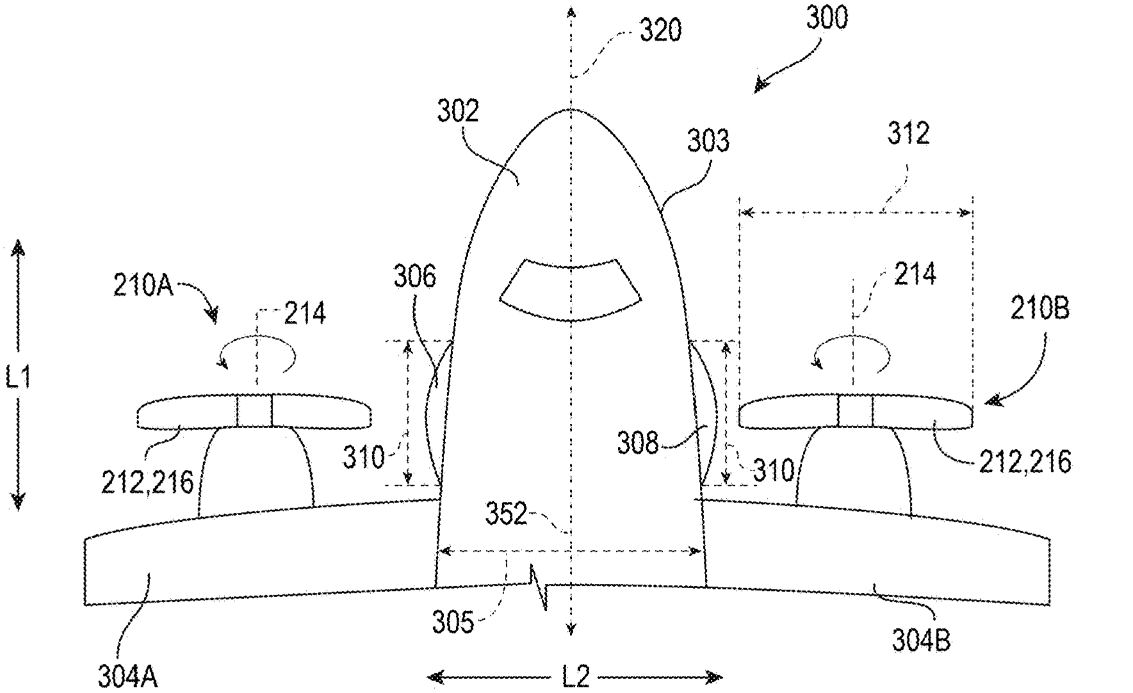
FIG. 13 is a schematic view of an aircraft incorporating a gas turbine engine in accordance with FIG. 12.

Turning now to FIG. 13, a schematic view of an aircraft 300 including a unducted fan propulsor 210 in accordance with an exemplary aspect of the present disclosure is provided. The exemplary aircraft 300 depicted generally includes a fuselage 302, a first wing 304A extending outwardly from a first side/port side of the fuselage 302, and a second wing 304B extending outwardly from a second side/starboard side of the fuselage 302. The exemplary aircraft 300 further includes a first unducted fan propulsor 210A mounted to the first wing 304A in an under wing configuration and a second unducted fan propulsor 210B mounted to the second wing 304B in and under wing configuration. The first and second unducted fan propulsors 210A, 210B may each be configured in a similar manner as the exemplary unducted fan propulsor 210 of FIG. 12. Accordingly, each of the first and second unducted fan propulsors 210A, 210B include a rotor assembly 212 rotatable about a centerline axis 214 of the respective engine.

As will be appreciated, the rotor assembly 212 of the first and second unducted fan propulsors 210A, 210B include a single stage of unducted blades 216. As such, there is no nacelle or similar structures surrounding the stage of blades 216 to contain the blades 216 in the event of a failure. Although not depicted, the first and second unducted fan propulsors 210A, 210B may additionally include a stage of stationary guide vanes (similar to the stage of guide vanes 218 of FIG. 12).

Accordingly, for the exemplary aircraft 300 depicted, the aircraft 300 includes a first fuselage shield 306 attached to or formed integrally with the first side/port side of the fuselage 302 proximate the rotor assembly 212 of the first unducted fan propulsor 210A and a second fuselage shield 308 attached to or formed integrally with the second side/starboard side of the fuselage 302 proximate to the rotor assembly 212 of the second unducted fan propulsor 210B.

More specifically, for the embodiment depicted, the fuselage 302 includes a fuselage exterior 303, which is generally an exterior surface of the fuselage 302, defined by an outer layer of the fuselage 302 (e.g., an outer layer of sheet metal, optionally including one or more coatings). The first fuselage shield 306 is placed on the fuselage exterior 303 and secured thereto, and similarly, the second fuselage shield 308 is also placed on the fuselage exterior 303 and secured thereto. In such a manner, it is noted that for the embodiment depicted the first and second fuselage shields 306, 308 are not integrated into an original design of the fuselage 302 and/or located within an outer layer of the fuselage 302, and instead are added as a supplement to the fuselage exterior 303 as described herein.

More specifically, referring particular to the first unducted fan propulsor 210A, it is noted that the aircraft 300 generally defines a longitudinal direction L1 and a lateral direction L2. The first fuselage shield 306 is attached to the fuselage 302 at a location aligned with the plurality of blades 216 of the rotor assembly 212 of the first unducted fan propulsor 210A along the longitudinal direction L1. Further, the first fuselage shield 306 defines a length 310 along the longitudinal direction L1, and the plurality of blades 216 of the rotor assembly 212 define a rotor assembly diameter 312 (which may be the same as the diameter D, described above with reference to, e.g., FIG. 3). For the embodiment depicted, the length 310 of the first fuselage shield 306 is equal to at least about 50% of the rotor assembly diameter 312, such as at least about 60% of the rotor assembly diameter 312, such as at least about 75% of the rotor assembly diameter 312, such as up to about 800% of the rotor assembly diameter 312.

Notably, the exemplary aircraft 300 depicted may generally be referred to as a "narrow body" aircraft having a single aisle extending along a length thereof. In certain embodiments, the fuselage defines a width 305 along the lateral direction L2 of at least 80 inches, such as at least 90 inches, such as at least 100 inches, such as at least 110 inches, such as at least 130 inches. However, in other embodiments, the aircraft 300 may alternatively be configured as a "wide body" aircraft having a multiple aisles extending along a length thereof and wider fuselage 302, such as up to 400 inches wide or up to 350 inches wide or up to 300 inches wide. In at least certain exemplary embodiments, the highest seating capacity of a narrow-body aircraft may be 295 passengers, while a wide body aircraft may be able to accommodate between 250 and 600 passengers. For example, two-abreast aircraft typically seat 4 to 19 passengers, three-abreast typically seat 24 to 45 passengers, four-abreast aircraft typically seat 44 to 80 passengers, five-abreast aircraft typically seat 85 to 130 passengers, six-abreast aircraft typically seat 120 to 230 passengers. By contrast, a regional aircraft is generally smaller than the narrow and wide body aircraft, capable of shorter flight times and carrying less passengers and/or cargo. For example, typical regional aircraft are designed to fly 100 passengers or less.

In such a manner, it is noted that the aircraft 300 is generally configured to carry a higher number of passengers, crew, and/or cargo than smaller aircraft, such as typical regional turboprop aircraft. With these smaller aircraft, the rotor blades (e.g., propellers) of the engines tend to be relatively small and light with a relatively small diameter, and the power delivered by the engine is lower than the larger and more powerful engines used on narrow body and wide body class commercial passenger aircraft. Moreover, among the disclosed embodiments of an unducted rotor engine the delivered power and rotor or blade size may be significantly larger than for a turboprop such that a risk of catastrophic damage in a failure event may be considered higher. For example, the rotor or blade size may be from 11 to 14 feet in diameter, or 11 feet, 12 feet, or between 12 and 14 feet in diameter. Taking into consideration these factors while, at the same time, addressing the impact in terms of increased weight, cost, and complexity and decreased efficiency (e.g., due to aerodynamic drag) associated with a shielding, the inventors arrived at a design that is believed to strike the correct balance between safety and efficiency, replaceability and maintenance of the shielding. It is noted that the embodiments of shielding disclosed herein address the unique challenges faced in respect to passenger and crew protection for narrow and wide body commercial passenger aircraft engine or aircraft designers.

By contrast with current narrow body and wide body aircraft, the inventors of the present disclosure have found that when desirable to incorporate an open rotor engine (as opposed to, e.g., a ducted turbofan engine), and particularly when desirable to incorporate an open rotor engine with rotor blades defining a relatively large diameter (such as at least six feet, such as at least eight feet, such as at least ten feet, such as at least twelve feet, such as up to 22 feet; such an engine is depicted in the embodiment of FIG. 12) the benefit and need of the fuselage shielding described herein may weigh in favor of inclusion of the fuselage shielding despite the increased weight and minimized, but still present, additional drag on the aircraft 300. As will be appreciated from the description herein, the fuselage shielding disclosed may allow for an aircraft to incorporate an unducted fan propulsor 210 with unducted rotor blades without having to redesign and/or reconstruct the fuselage 302 to incorporate the fuselage shielding the inventors have found to be beneficial.

It is noted, however, that although described above as being applied to narrow body and wide body aircraft, in other embodiments, aspects of the present disclosure may further be applied to regional aircraft.

Figure 14:
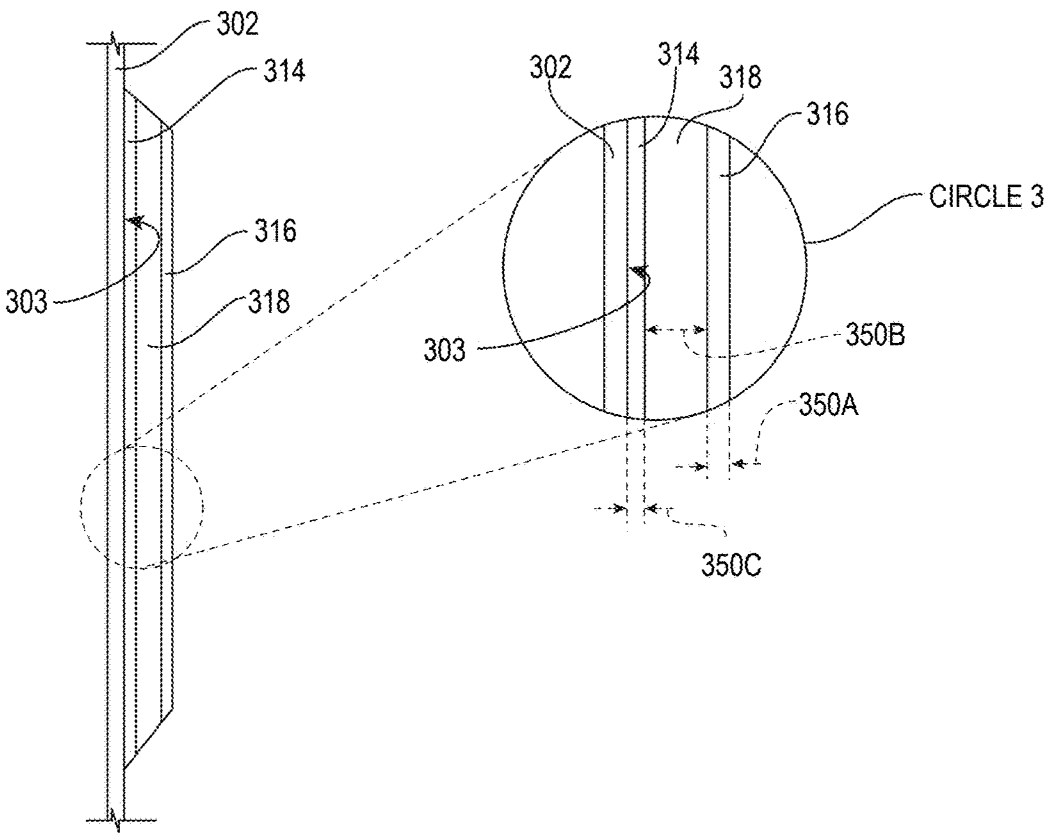
FIG. 14 is a schematic view of a fuselage shield in accordance with an exemplary embodiment of the present disclosure.

Further, turning now to FIG. 14, it is noted that the first fuselage shield 306 defines a plurality of layers. More specifically, the first fuselage shield 306 includes a first layer and a second layer. In the embodiment shown, the first layer is an energy distribution layer 316 and the second layer is an energy absorption layer 318. The exemplary fuselage shield 306 depicted additionally includes a third layer, which for the exemplary embodiment depicted is a load spreading layer 314. The load spreading layer 314 is positioned adjacent to the fuselage 302 and the energy distribution layer 316 is spaced from the fuselage 302. Further, the energy absorption layer 318 is positioned between the load spreading layer 314 and the energy absorption layer 318. More specifically, for the exemplary embodiment depicted, the energy distribution layer 316 is positioned closer to the stage of unducted blades 216 of the first unducted fan propulsor 210A than the energy absorption layer 318, and the energy absorption layer 318 is positioned closer to the stage of unducted blades 216 of the first unducted fan propulsor 210A than the load spreading layer 314.

In the event of a failure of the rotor assembly 212 of the first unducted fan propulsor 210A, debris may strike the energy distribution layer 316, which may prevent such debris from cutting through and penetrating the first fuselage shield 306. The energy absorption layer 318 may absorb the energy transferred from the energy distribution layer 316 from the debris. Finally, the load spreading layer 314 may distribute energy from the energy absorption layer 318 across the fuselage 302 to prevent any deformation of the fuselage 302.

In certain exemplary embodiments, the energy distribution layer 316 may be a metal (such as one or more pieces of sheet metal), a Kevlar, a carbon fiber composite (e.g., such as a carbon fiber composite with a polymeric resin, such as epoxy), a ceramic (such as a ceramic plate or ceramic fiber), a combination thereof, or other material capable of stopping debris from penetrating therethrough. The load spreading layer 314 may be a metal layer, a graphite or an epoxy layer, a carbon fiber composite (e.g., such as a carbon fiber composite with a polymeric resin, such as epoxy), etc.

Further, it is noted that the energy absorption layer 318 may be formed of any material capable of absorbing a desired amount of energy. For example, turning now to FIGS. 15 and 16, close-up, cross sectional views are provided of two fuselage shields 306 in accordance with two exemplary embodiments of the present disclosure. Each of the fuselage shields 306 may be configured in similar manner as the exemplary first fuselage shield 306 described above. Accordingly, the fuselage shields 306 of FIGS. 15 and 16 generally include a load spreading layer 314, an energy absorption layer 318, and an energy distribution layer 316. The load spreading layer 314 and energy distribution layer 316 may be formed of materials described above, or other suitable materials. The energy absorption layer 318 in these embodiments are formed of a relatively low dense material, having a low solidity percentage (a percent by volume that the material that is a solid (as compared to air or other gas) under nominal stresses). For example, the material forming the energy absorption layers 318 in these embodiments may define a solidity percentage less than 75%, such as less than 60%, such as less than 50%, such as less than 40%, such as at least 10%, such as at least 25%.

Figure 15:
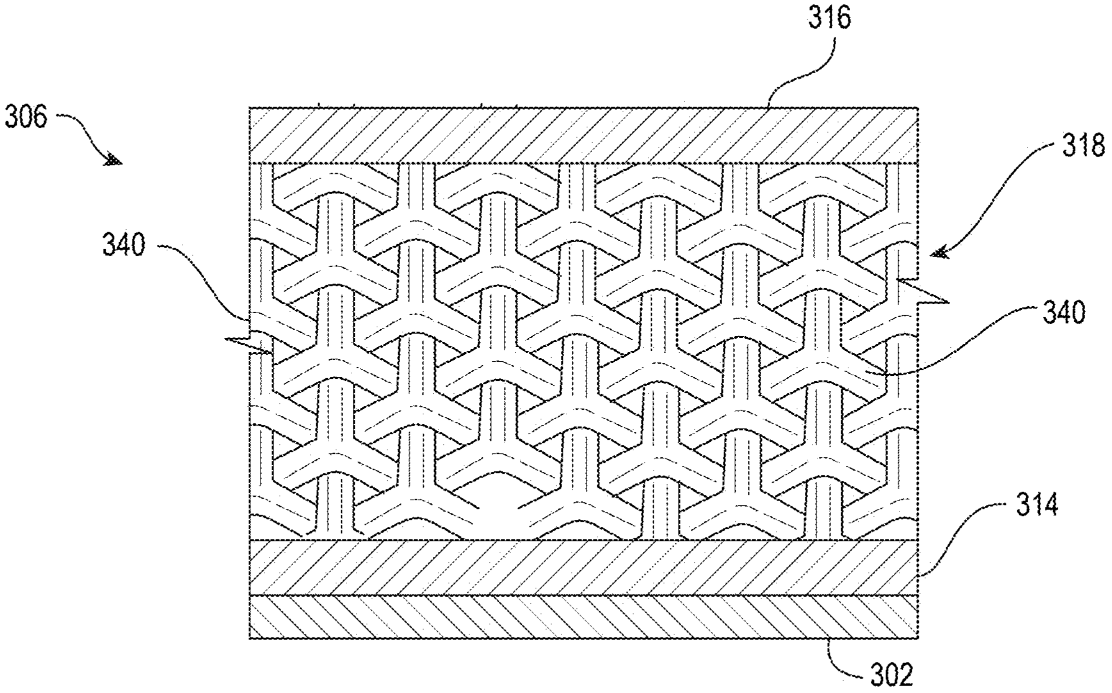
FIG. 15 is a cross-sectional view of a fuselage shield in accordance with another exemplary embodiment of the present disclosure.

Referring particularly to FIG. 15, it is noted that the energy distribution layer 316 is formed of a lattice structure. The lattice structure includes a plurality of interwoven members 340, which may bend to allow the structure to compress and absorb energy in the event the fuselage shield 306 is struck with debris. The lattice structure may be formed through a 3D printing process/additive manufacturing process, or any other suitable formation process. The members 340 may be formed of a metal, a plastic, an elastomeric material, etc.

Figure 16:
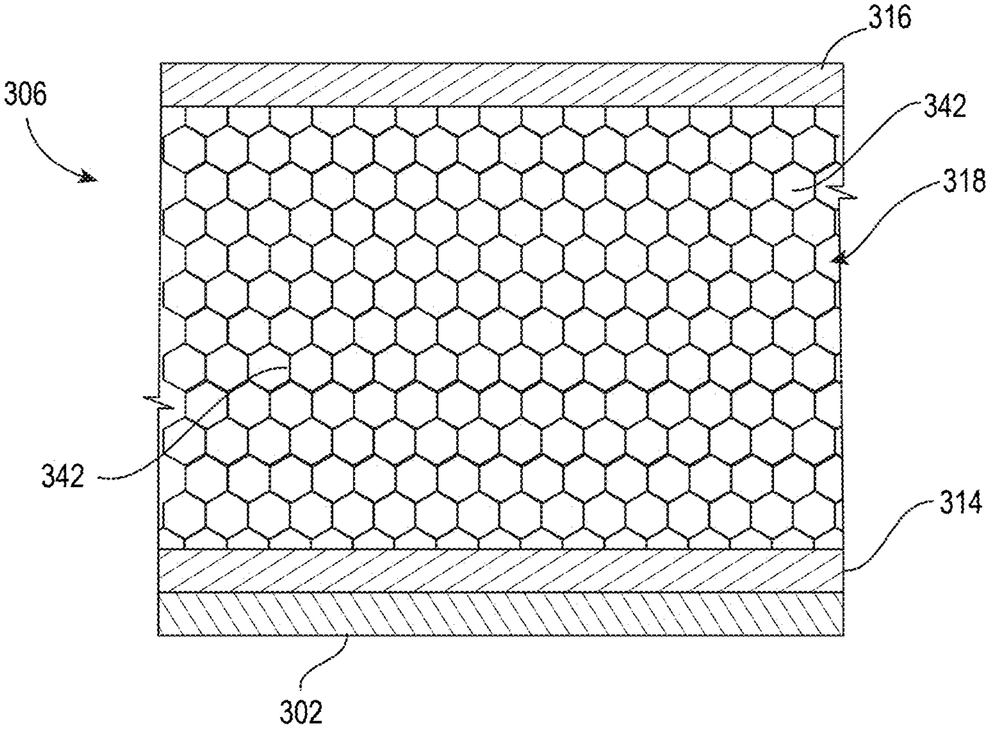
FIG. 16 is a cross-sectional view of a fuselage shield in accordance with yet another exemplary embodiment of the present disclosure.

Referring particularly to FIG. 16, it is noted that the energy distribution layer 316 is formed of a honeycomb structure. The honeycomb structure includes a plurality of members 342 connected to form a polygonal geometric pattern, and more specifically for the exemplary embodiment depicted, to form a hexagonal geometric pattern. The members 342 may be flexible to allow the material to compress and absorb energy in the event the fuselage shield 306 is struck with debris. The honeycomb structure may be formed through a 3D printing process/additive manufacturing process, or any other suitable formation process. The members 342 may be formed of a metal, a plastic, an elastomeric material, etc.

It is noted, however, that in other exemplary embodiments, the energy distribution layer 316 may be formed of any other suitable material/structure. For example, in other embodiments, the energy distribution layer 316 may be formed of, e.g., a foam material, a polyurethane material, or any other suitable material capable of absorbing energy. Additionally, the energy distribution layer 316 may be formed of any other suitable structure capable of absorbing energy.

Figure 17:
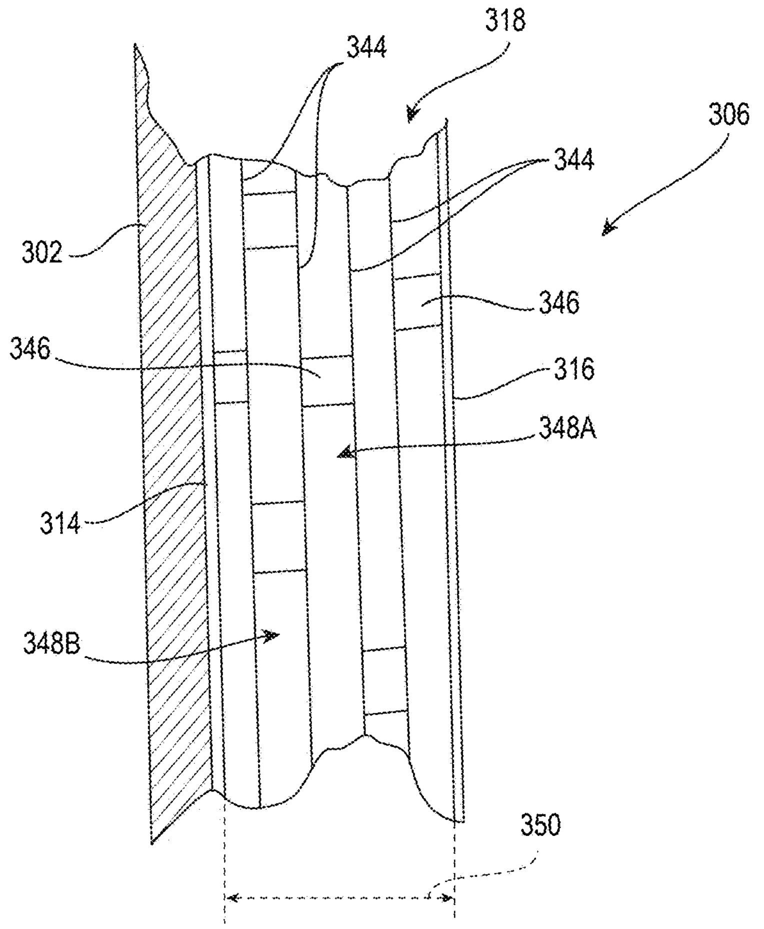
FIG. 17 is a cross-sectional view of a fuselage shield in accordance with still another exemplary embodiment of the present disclosure.
Figure 18:
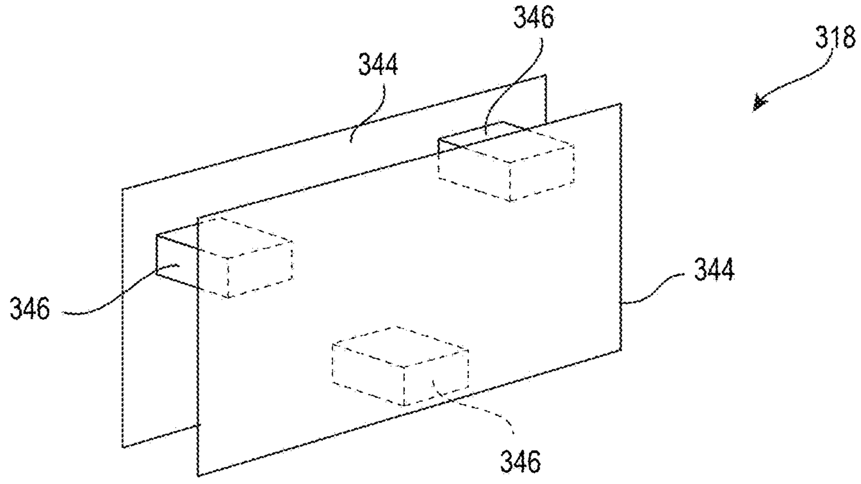
FIG. 18 is a perspective view of a portion of the exemplary fuselage shield of FIG. 17.

For example, turning now to FIGS. 17 and 18, close-up views are provided of a fuselage shield 306 in accordance with another exemplary embodiment of the present disclosure. The fuselage shield 306 depicted may also be configured in a similar manner as the exemplary first fuselage shield 306 described above. Accordingly, the fuselage shield of FIGS. 17 and 18 generally includes a load spreading layer 314, an energy absorption layer 318, and an energy distribution layer 316. The load spreading layer 314 and energy distribution layer 316 may be formed of materials described above, or any other suitable material. However, the energy absorption layer 318 of the embodiment shown is formed of a plurality of sheets 344 and plurality of spacers 346 positioned between adjacent sheets 344 of the plurality of sheets 344.

Specifically, referring first to FIG. 17, providing a close-up, cross-sectional view of the energy distribution layer 316, it is noted that the plurality of sheets 344 are spaced along a thickness 350 of the fuselage shield 306 between the load spreading layer 314 and the energy distribution layer 316. Further, the plurality of sheets 344 depicted includes at least two sheets 344, and more specifically includes four sheets 344. The plurality of sheets 344 may include up to twenty-five (25) sheets 344. The plurality of sheets 344 may be formed of a sheet metal material, a metal alloy, a composite, or any other suitable material. For example, in certain embodiments, one or more of the plurality of sheets 344 may be formed of a metal composite, a steel, a depleted uranium, a tungsten, a titanium, an Inconel, a molybdenum, an aluminum, a magnesium, an aluminum-lithium alloy, combinations thereof, etc.

Further, referring now particularly to FIG. 18, providing a perspective view of section of a pair of adjacent sheets 344, it is noted that between each pair of adjacent sheets 344, the energy absorption layer 318 includes a plurality of spacers 346. For example, the energy absorption layer 318 may include at least two spacers 346, and up to one hundred (100) spacers 346, such as up to fifty (50) spacers 346, such as up to twenty-five (25) spacers 346. The spacers 346 may define a length to width ratio between 10:1 and 1:10, such as between 5:1 and 1:5, such as between 2:1 and 1:2, such as equal to about 1:1. Moreover, referring also to FIG. 17, it is noted that the spacers 346 are generally misaligned along the thickness 350 of the energy absorption layer 318. Specifically, for the exemplary embodiment depicted, the spacers 346 in a first gap 348A defined between adjacent sheets 344 do not overlap as viewed along a thickness 350 of the fuselage shield 306 with the spacers 346 in a second gap 348B (positioned adjacent to the first gap 348A and defined in part by a common sheet 344).

In such a manner, it is noted that for the exemplary energy absorption layer 318 depicted in FIGS. 17 and 18, the sheets 344 may deform to absorb energy transferred thereto from the energy distribution layer 316.

Referring now back also to FIG. 14, it is noted from the discussion hereinabove that the load spreading layer 314 defines a first density, the energy absorption layer 318 defines a second density, and the energy distribution layer 316 defines a third density. For the embodiment depicted, the first density and the third density are each greater than the second density of the energy absorption layer 318. For example, in certain exemplary embodiments, the first density, the third density, or both may be at least about 20% greater than the second density, such as at least about 50% greater, such as at least about 100% greater, such as at least about 200% greater, such as at least about 500% greater, such as up to about 10,000% greater than the second density.

Further, referring specifically to the callout Circle 14 in FIG. 14, it is noted that the energy distribution layer 316 defines a first thickness 350A, the energy absorption layer 318 defines a second thickness 350B, and the load spreading layer 314 defines a third thickness 350C. As used herein, the term "thickness" refers to a maximum thickness of the component being described, such as a maximum thickness of the layer of the fuselage shield 306.

For the embodiment show, the first thickness 350A is at least 0.05 inches and up to 2.5 inches, such as at least 0.1 inches, such as at least 0.5 inches, such as at least 0.75 inches, such as up to 2.25 inches, such as up to 2 inches. Further for the embodiment show, the third thickness 350C is at least 0.05 inches and up to 2.5 inches, such as at least 0.1 inches, such as at least 0.5 inches, such as at least 0.75 inches, such as up to 2.25 inches, such as up to 2 inches. Further, still, for the exemplary embodiment depicted, the second thickness 350B is at least 0.25 inches and up to 4 inches, such as at least 0.35 inches, such as at least 0.5 inches, such as at least 1 inch, such as at least 2 inches, such as up to 3.75 inches, such as up to 3.5 inches.

In such a manner, it is noted that the second thickness 350B of the energy absorption layer 318 may be greater than the first thickness 350A and third thickness 350C, such as at least about 50% greater, such as at least about 100% greater, such as up to about 10000% greater. Such may allow for the lower density of the energy absorption layer 318, which may allow for the energy absorption layer 318 to absorb more energy in the event the fuselage shield 306 is struck with debris.

As will also be appreciated from the FIGS. and the discussion herein, it may be beneficial to configure and/or orient the fuselage shield for the estimated debris it is meant to protect the fuselage 302 from. For example, turning now to FIGS. 19 and 20 (and also back to FIG. 13), it is noted that in certain exemplary embodiments, the first fuselage shield 306 may be configured in a different manner than the second fuselage shield 308. For example, it is noted that, as indicated by the circular arrows in FIG. 13 (extending about centerlines 214), the plurality of blades 216 of the rotor assemblies 212 of the first and second unducted fan propulsors 210A, 210B rotate in the same rotational direction, but given their location on opposing sides of the fuselage 302, approach the fuselage 302 in a different manner. For example, the blades 216 of the rotor assembly 212 of the first unducted fan propulsor 210A approach from below the aircraft 300, while the blades 216 of the rotor assembly 212 of the second unducted fan propulsor 210B approach from above the aircraft 300. As such, an estimated strike from debris from the first unducted fan propulsor 210A may be different from an estimated strike from debris from the second unducted fan propulsor 210B in the event of a failure of these engines.

Therefore, in at least certain exemplary embodiments, the first fuselage shield 306 is positioned asymmetrically relative to the second fuselage shield 308 relative to a reference plane 320 extending along the longitudinal direction L1 and a vertical direction V of the aircraft 300, through a center 352 of the fuselage 302 and of the aircraft 300.

Specifically, for the embodiment depicted, the first fuselage shield 306 may be mounted to the fuselage 302 at a different position and/or in a different orientation than the second fuselage shield 308. More specifically, referring particularly to FIG. 19, providing a plan view of a first side/port side of the fuselage 302, and to FIG. 20, providing a plan view of a second side/starboard side of the fuselage 302, it is noted that the first fuselage shield 306 and second fuselage shield 308 may be mounted in a manner particular for the specific engines, and in a manner to most appropriately accommodate any debris that may result from such engines.

Figure 20:
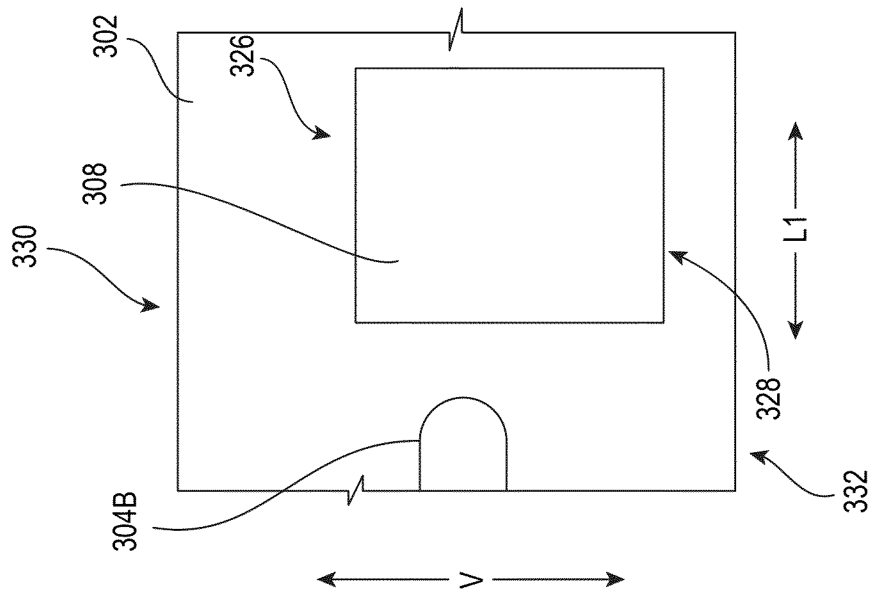
FIG. 20 is a schematic view of the fuselage of the aircraft of FIG. 13 including a second fuselage shield.
Figure 19:
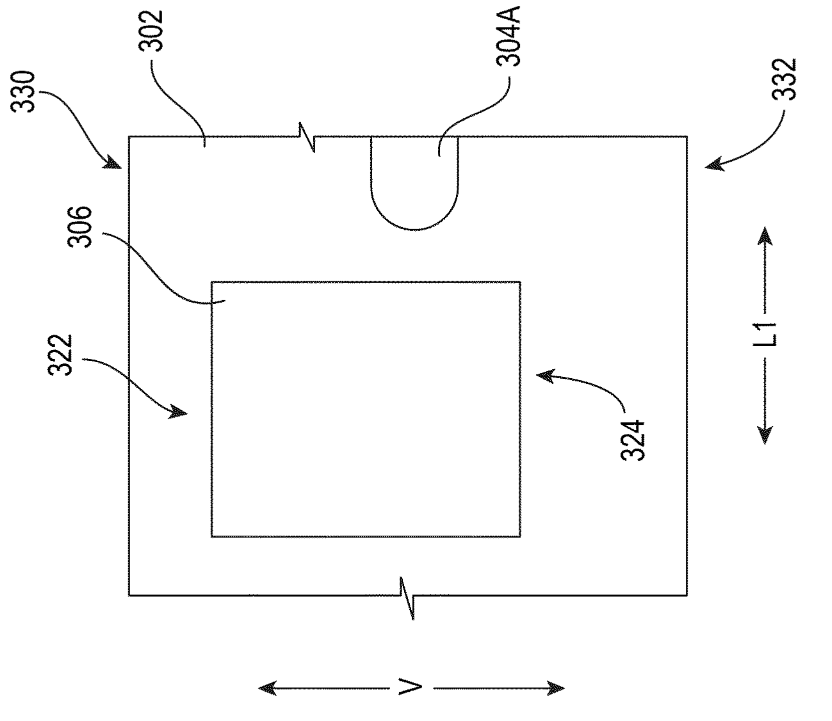
FIG. 19 is a schematic view of a fuselage of the aircraft of FIG. 13 including a first fuselage shield.

More specifically, still, as will be appreciated from FIGS. 19 and 20, the asymmetrical positioning of the first fuselage shield 306 and the second fuselage shield 308 relative to the reference plane 320 is derived from a vertical positioning of the first fuselage shield 306 and second fuselage shield 308. For example, the first fuselage shield 306 defines a top 322 and a bottom 324 along the vertical direction V, and similarly, the second fuselage shield 308 defines a top 326 and a bottom 328 along the vertical direction V. The top 322 of the first fuselage shield 306 is position higher along the vertical direction V than the top 326 of the second fuselage shield 308, and as such is closer to a top portion 330 of the fuselage 302. Further, the bottom 324 of the second fuselage shield 308 is positioned lower along the vertical direction V than the bottom 328 of the first fuselage shield 306, and as such is closer to a bottom portion 332 of the fuselage 302.

Figure 21:
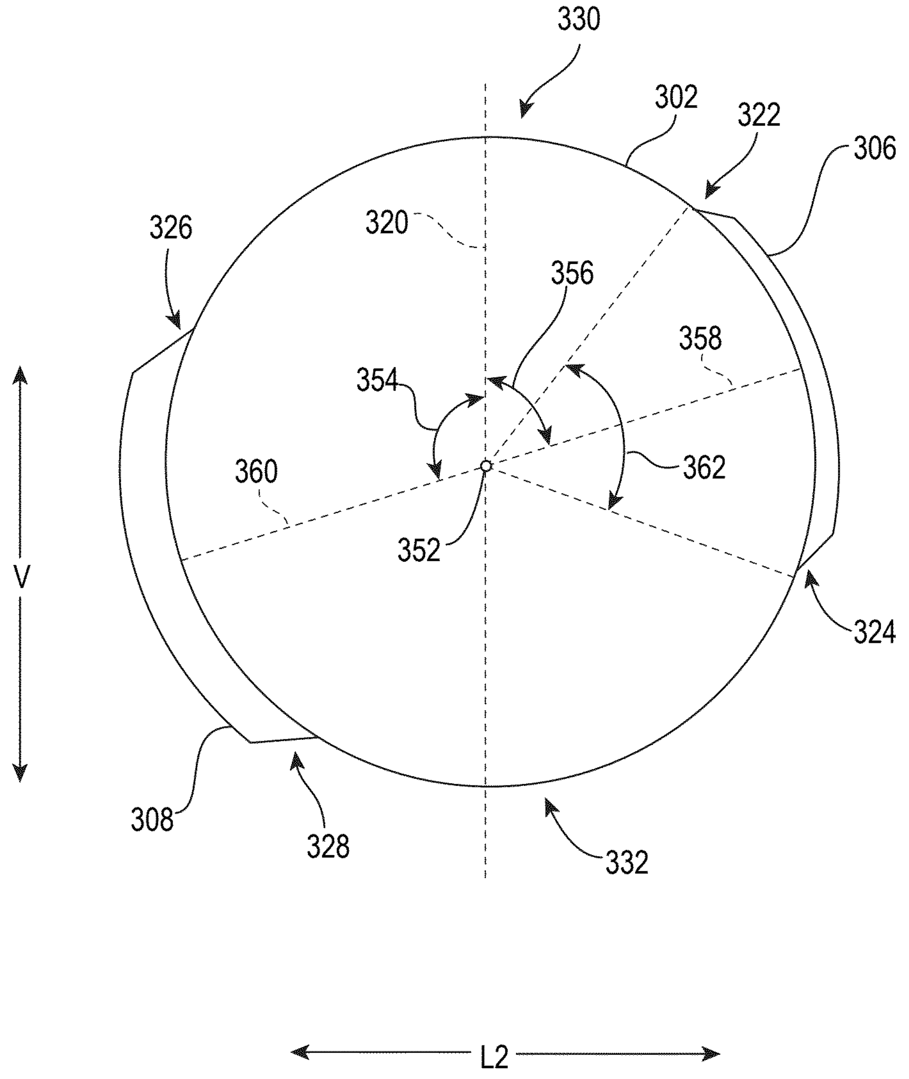
FIG. 21 is a forward-looking-aft, cross-sectional view of the fuselage of the aircraft of FIG. 13.

Such a configuration may also be seen in FIG. 21, providing a forward-looking-aft, cross-sectional view of the fuselage 302 of the aircraft of FIG. 13. As described above, the fuselage 302 includes the first fuselage shield 306 and the second fuselage shield 308. The first fuselage shield 306 includes the top 322 and the bottom 324, and the second fuselage shield 308 includes the top 326 and the bottom 328. As is depicted in FIG. 21, the first fuselage shield 306 assembly defines a first absolute positioning angle 354 relative to a top portion of a vertical reference line extending through the center 352 of the fuselage 302, or more specifically relative to a top portion of the reference plane 320. Similarly, the second fuselage shield 308 assembly defines a second absolute positioning angle 356 relative to the top of the vertical reference line extending through the center 352 of the fuselage 302, or more specifically relative to the top portion of the reference plane 320. As used herein, the term "absolute positioning angle" refers to the absolute value of an angle between two lines. Further, it is noted that the absolute positioning angle of the first fuselage shield 306 is measured from a reference line 358 extending from the center 352 of the fuselage 302 and a center of the first fuselage shield 306 (as measured along a circumference of the fuselage 302), and similarly the absolute positioning angle of the second fuselage shield 308 is measured from a reference line 360 extending from the center 352 of the fuselage 302 and a center of the second fuselage shield 308 (also as measured along a circumference of the fuselage 302).

For the exemplary embodiment depicted, the difference between the first absolute positioning angle 354 and the second absolute positioning angle 356 is at least five degrees and up to fifty (50) degrees. For example, in certain exemplary embodiments, the difference between the first absolute positioning angle 354 and the second absolute positioning angle 356 may be at least ten degrees, such as at least fifteen (15) degrees, such as up to forty-five (45) degrees, such as up to forty (40) degrees, such as up to thirty-five (35) degrees.

As will be appreciated for the embodiment depicted, the asymmetric positioning of the first fuselage shield 306 and the second fuselage shield 308 may provide for a desired amount of protection for the fuselage 302, without requiring excess fuselage armor, which may lead to an overall heavier aircraft 300, and further may increase an airflow resistance of the aircraft 300.

Moreover, it is noted that the first fuselage shield 306 and second fuselage shield 308 may be sized and/or arranged to provide the desired coverage for the particular gas turbine engine in question. For example, referring still to FIG. 21, will be appreciated that the first fuselage shield 306 defines a coverage span is measured along a circumference of the fuselage 302. More specifically, it is noted that the first fuselage shield 306 defines a coverage span angle 362 between the top 322 and the bottom 324 of the first fuselage shield 306, as measured from the center 352 of the fuselage 302. The coverage span angle 362 for the first fuselage shield 306 is at least forty-five (45) degrees and up to one hundred and eighty (180) degrees. For example, in certain exemplary embodiments, the coverage span angle 362 for the first fuselage shield 306 may be at least about fifty-five (55) degrees and up to about one hundred and twenty (120) degrees. It is noted that the second fuselage shield 308 may define a similar coverage span angle.

In such manner, it will further be appreciated that the fuselage shield 306 may define a surface area sufficient to provide the desired amount of coverage. In at least certain exemplary embodiments, the first fuselage shield 306, the second fuselage shield 308, or both may define a surface area of at least 720 square inches and up to 15,000 square inches. For example, the first fuselage shield 306, the second fuselage shield 308, or both may define a surface area of at least 1000 square inches, such as at least 1200 square inches, such as up to 13,000 square inches, such as up to 10,000 square inches.

Moreover, referring back briefly to FIGS. 19 and 20, it is noted that the fuselage shields 306, 308 are positioned on the fuselage 302 in a manner aligned with the vertical direction V, such that a mounting angle of the fuselage shields 306, 308 is equal to 0 degrees.

In other embodiments, however, the fuselage shields 306, 308 may be positioned on the fuselage 302 in a manner such that the fuselage shields 306, 308 define a mounting angle not equal to 0. For example, the mounting angle may correspond to the angle θ of the unducted fan propulsor relative to the airfoil section (see, e.g., FIG. 5A). For example, the mounting angle may be equal to the angle θ of the unducted fan propulsor relative to the airfoil section, plus or minus 30 degrees. The mounting angle of the fuselage shields 306, 308 may refer to an angle between the vertical direction and a reference line extending from a center of a top of the fuselage shield to a center of a bottom of the fuselage shield in a vertical/longitudinal plane (as viewed in FIGS. 19 and 20).

Moreover, in certain exemplary embodiments, it will be appreciated that the unducted fan propulsor has an inward toe angle of between 0 and 5 degrees, or 1 and 3 degrees (see, e.g., FIG. 6C). With such an exemplary embodiment, the fuselage shields 306, 308 on the fuselage 302 can be oriented in a mounting angle not equal to 0 degrees relative to the vertical direction, corresponding to the toe angle of the unducted fan propulsor.

As explained above, certain areas of the fuselage 302 may be more susceptible to higher force impacts from debris than others due to, e.g., a proximity to the gas turbine engines, a rotational direction of the blades 216 of the gas turbine engine, etc. In order to further protect from such higher force impacts, without unnecessarily increasing a weight of the fuselage shield 306 and aircraft, in at least certain exemplary embodiments, the fuselage shield 306 may be designed to accommodate different force impacts at various positions along the fuselage shield 306. For example, turning now to FIGS. 22 and 23, in certain exemplary embodiments the fuselage shield 306 may include a plurality of zones arranged along a circumference of the fuselage 302 such that an impact resistance of the fuselage shield 306 varies between each of the adjacent zones along the circumference of the fuselage 302.

Figure 22:
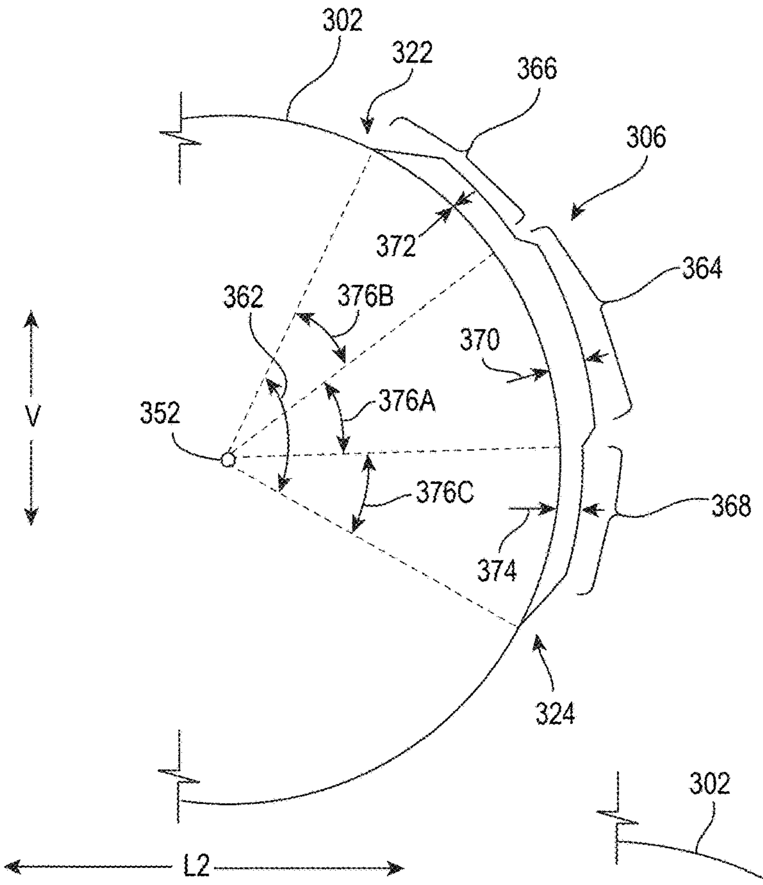
FIG. 22 is a forward-looking-aft, cross-sectional view of a fuselage of an aircraft having a fuselage shield in accordance with an exemplary embodiment of the present disclosure.

Referring particularly to FIG. 22, a forward-looking-aft, cross-sectional view of a fuselage 302 including a fuselage shield 306 in accordance with an exemplary embodiment of the present disclosure is provided. The exemplary fuselage shield 306 depicted may be configured in a similar manner as the exemplary first fuselage shield 306 described above, or may be configured in any other suitable manner.

The exemplary fuselage shield 306 of FIG. 22 includes a first zone 364 having a first impact resistance and a second zone 366 having a second impact resistance, with the first zone 364 and the second zone 366 arrange along the circumference of the fuselage 302. More specifically, for the embodiment of FIG. 22, the fuselage shield 306 further includes a third zone 368 having a third impact resistance. The second zone 366 and the third zone 368 are arranged on opposing sides of the first zone 364 along the circumference of the fuselage 302. The first impact resistance of the first zone 364 of the fuselage shield 306 is greater than the second impact resistance of the second zone 366 and is also greater than the third impact resistance of the third zone 368.

Specifically, for the exemplary embodiment depicted, the variance in impact resistance is due at least in part to a thickness of the plurality of zones. More specifically, for the exemplary embodiment depicted, the first zone 364 defines a first thickness 370 that is greater than a second thickness 372 of the second zone 366 and greater than a third thickness 374 of the third zone 368. When the fuselage shield 306 is configured in accordance with one or more the exemplary embodiments above, such as the embodiment of FIG. 14 wherein the fuselage shield 306 includes a plurality of layers, the configuration of FIG. 22 may facilitate an outer layer (e.g., energy distribution layer 316), a middle layer (e.g., energy absorption layer 318), and/or an inner layer (e.g., load spreading layer 314) of the first zone 364 being thicker than the respective layer of the second zone 366 and/or third zone 368.

Notably, for the embodiment of FIG. 22, the different zones of the fuselage shield 306 are formed integrally together as a single fuselage shield 306. However, in other embodiments, the fuselage shield 306 may have still other configurations. Further for the exemplary embodiment depicted, it is noted that the first zone 364, the second zone 366 and the third zone 368 each define respective span angles 376A, 376B, 376C (measured in the same way the span angle 364 of the first fuselage shield 306 is measured in FIG. 21). The span angles 376A, 376B, 376C are approximately equal to one another in FIG. 22. In other embodiments, however, the span angles 376A, 376B, 376C may vary between the zones 364, 366, 368. For example, in certain exemplary embodiments, each of the zones 364, 366, 368 may define a span angle 376A, 376B, 376C equal to at least 10% of the total span angle 362 of the first fuselage shield 306 and up to 80% of the total span angle 362 of the first fuselage shield 306.

Figure 23:
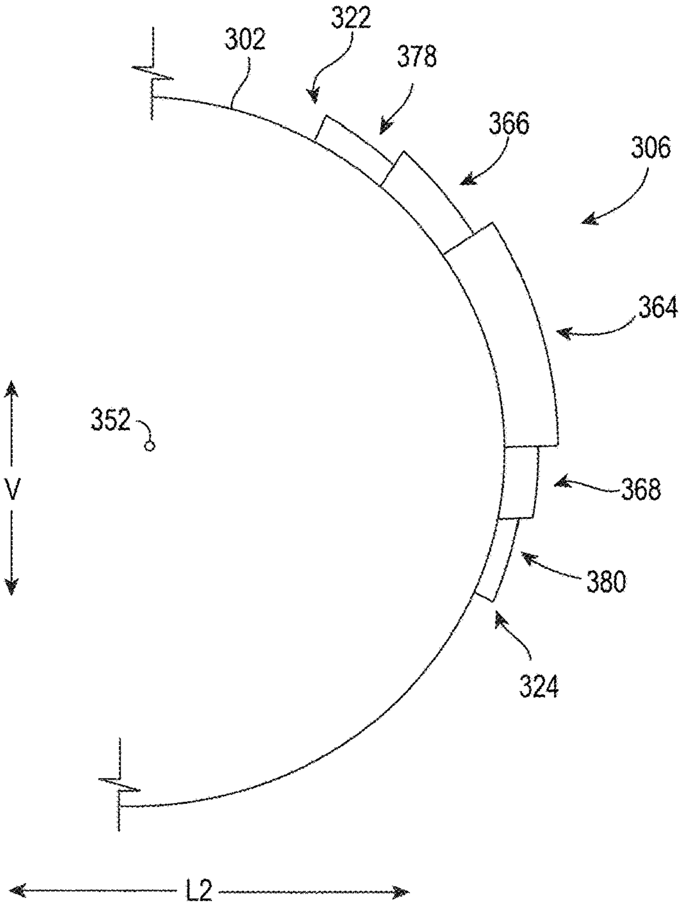
FIG. 23 is a forward-looking-aft, cross-sectional view of a fuselage of an aircraft having a fuselage shield in accordance with another exemplary embodiment of the present disclosure.

For example, turning now to FIG. 23, a forward-looking-aft, cross-sectional view of a fuselage 302 including a fuselage shield 306 in accordance with another exemplary embodiment of the present disclosure is provided. The exemplary fuselage shield 306 FIG. 23 again includes a plurality of zones arrange along a circumference of the fuselage 302 with an impact resistance of the fuselage shield 306 varying between the adjacent zones. In the embodiment shown, the plurality of zones includes at least four zones and up to 10 zones. Specifically, for the exemplary embodiment depicted, the plurality of zones includes five zones (a first zone 364, a second zone 366, a third zone 368, a fourth zone 378, and a fifth zone 380). Although not labeled, a thickness of the fuselage shield 306 varies between each of the adjacent zones (e.g., adjacent zones 364 and 366, and adjacent zones 366 and 378). For the embodiment of FIG. 23, each of the adjacent zones are configured as separate components which may be individually attached to the fuselage 302, or alternatively, may be attached to one another prior to being attached the fuselage 302.

It is noted that although the differing impact resistances between adjacent zones if the embodiments of FIGS. 22 and 23 is provided at least in part by varying a thickness of the respective adjacent zones, in other embodiments, the differing impact resistances between adjacent zones may be provided in any other suitable manner. For example, in other embodiments the differing impact resistances between adjacent zones may be provided through material choices, layer relative thicknesses, a combination thereof, etc. In such a manner, it is noted that in other exemplary embodiments, the fuselage shield 306 may define a plurality of zones having differing impact resistances between adjacent zones, while maintaining a relatively constant thickness between adjacent zones. Such may be desired for, e.g., aerodynamic reasons, aesthetic reasons, etc.

As will be appreciated, inclusion of a fuselage shield 306 having different zones, with adjacent zones having different impact resistances, may allow for the fuselage shield 306 to be tailored to the coverage desired/required for the specific gas turbine engine, including a position of the gas turbine engine relative to through the fuselage 302, a spacing of the gas turbine engine relative to the fuselage 302, a rotational direction of a rotor assembly 212 of the gas turbine engine, etc. In such a manner, the fuselage shield 306 may not add more weight, air resistance, etc. than necessary to provide the desired/required impact resistance to the fuselage 302.

Further, it is noted that although the exemplary zones described above are arranged along a circumference of the fuselage 302, it is noted that in certain exemplary embodiments, one or more of the zones may also be arranged along the longitudinal direction L1 of the aircraft 300 (e.g., along the length 310 of the fuselage shield 306; see FIG. 13).

Moreover, it is noted that although in certain exemplary embodiments, the exemplary fuselage shields 306 described above may (except as otherwise described) be configured in a similar manner as the exemplary first fuselage shield 306 described above, in other embodiments, the fuselage shield 306 may be configured in any other suitable manner. For example, in certain exemplary embodiments, the fuselage shield 306 may not include three layers, and instead may only include two layers, or alternatively may include any other suitable number of layers (e.g., one, four, five, six or more). Additionally, the number and/or configuration of layers (if included) may vary between zones.

Moreover, as noted above, the first fuselage shield 306 and second fuselage shield 308 may be attached to, or formed integrally with, the fuselage 302. For example, in certain exemplary embodiments, the first fuselage shield 306, the second fuselage shield 308, or both may be welded to the fuselage 302 or otherwise irremovably formed integrally with the fuselage 302.

However, in other exemplary embodiments, it is noted that the first fuselage shield 306, the second fuselage shield 308, or both may be removably coupled to the fuselage 302. For example, turning now to FIG. 24, a plan view of a fuselage shield 306 in accordance with yet another exemplary embodiment of the present disclosure is depicted attached to a fuselage 302. The fuselage shield 306 may be configured in a similar manner as the exemplary first fuselage shield 306 described above, or alternatively may be configured in any other suitable manner.

For the exemplary embodiment depicted, the fuselage shield 306 is removably coupled to the fuselage 302. As with the embodiments above, the fuselage shield 306 depicted in FIG. 24 may be removably coupled to the fuselage 302 at a location in alignment with a stage of rotor blades of an unducted rotor assembly of the gas turbine engine along a lateral direction of the aircraft.

For the exemplary embodiment depicted, the fuselage shield 306 is removably coupled to the fuselage 302 using a plurality of mechanical fasteners 338. Additionally, the fuselage shield 306 includes a plurality of openings 336 through which a respective plurality of mechanical fasteners 338 may extend to couple the fuselage shield 306 to the fuselage 302.

More specifically, still, referring briefly to the callout Circle 24, the plurality of openings 336 of the fuselage shield 306 may be configured as a plurality of countersunk screw openings for receiving correspondingly shaped screws, or other mechanical fasteners, that are countersunk into the fuselage shield 306 to reduce or eliminate an aerodynamic drag generated by the mechanical fasteners 338.

It is noted, however, that in other exemplary embodiments, the fuselage shield 306 may be attached to the fuselage 302 in any other suitable manner, using any other suitable mechanical fasteners 338 or other fastening means. For example, in other embodiments, the fuselage shield 306 may be attached entirely the plurality of mechanical fasteners 338, such as one or more countersunk screws, bolts, etc., or through some combination of mechanical fasteners 338, features attached to or formed with the fuselage 302, a glue, an epoxy, or the like.

Figure 24:
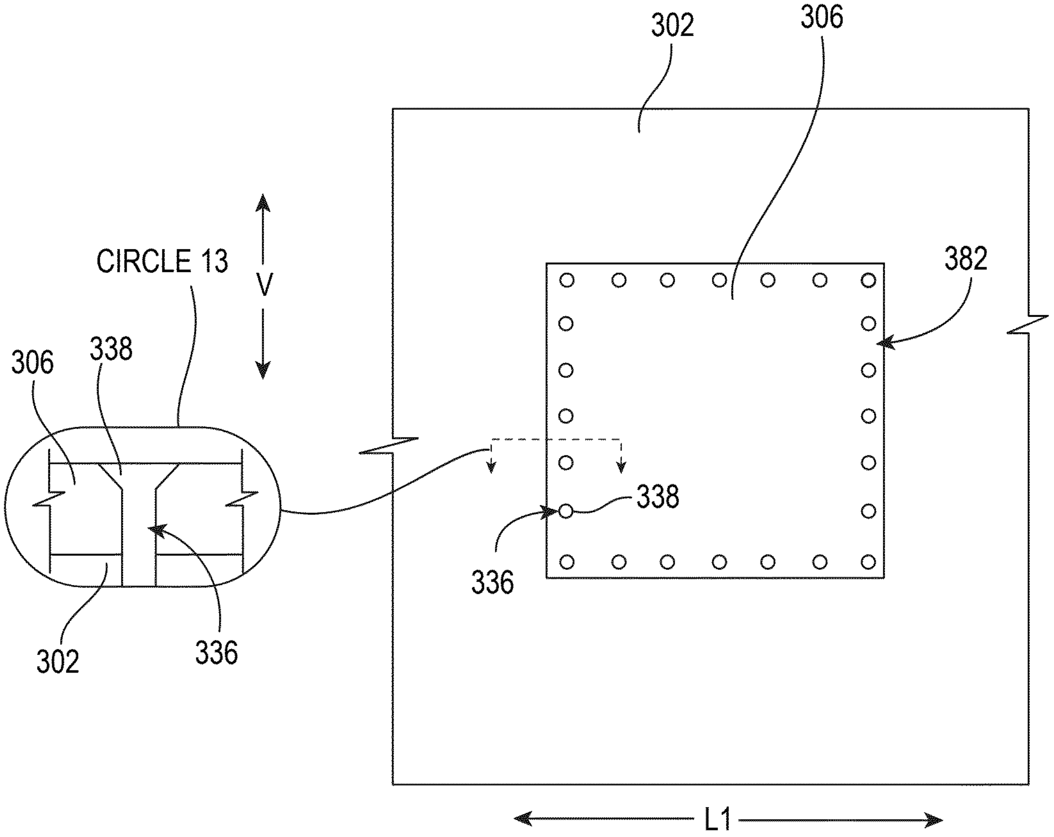
FIG. 24 is a schematic, plan view of a fuselage of an aircraft including a fuselage shield in accordance with the present disclosure.

Referring still to FIG. 24, will be appreciated that the fuselage shield 306 defines a perimeter 382 (an area extending around an outermost edge of the fuselage shield 306, closer to the outermost edge than a center), and the fuselage shield 306 is removably coupled to the fuselage 302 with a plurality fasteners, or rather, the plurality of mechanical fasteners 338, arranged in a density of at least one fastener per inch and up to twenty-five (25) fasteners per inch. Such a configuration may ensure the fuselage shield 306 is coupled to the fuselage 302 in a manner that prevents airflow from passing between the fuselage shield 306 and the fuselage 302, creating excess drag on the aircraft.

Moreover, it is noted that the fuselage shield 306 includes additional features to reduce a drag on the aircraft when the fuselage shield 306 is coupled to the fuselage 302 of the aircraft. For example, turning now to FIG. 25, a cross-sectional view of the exemplary fuselage shield 306 and fuselage 302 of FIG. 24 is depicted. As shown, the fuselage shield 306 extends along the longitudinal direction L1 between a forward end 384 and an aft end 386. The forward end 384 of the fuselage shield 306 defines a forward end taper 388 having a forward end taper angle 390 with the fuselage 302 of at least one (1) degree and up to fifteen (15) degrees. Specifically, for the exemplary embodiment depicted, the forward end taper angle 390 of the forward end 384 is less than or equal to seven (7) degrees. Similarly, for the exemplary embodiment depicted, the aft end 386 defines an aft end taper 392 having an aft end taper angle 394 with the fuselage 302 of at least one (1) degree and up to fifteen (15) degrees, such as up to seven (7) degrees. Inclusion of the forward end taper 388 and the aft end taper 392 may reduce an aerodynamic drag on the aircraft by virtue of the inclusion of the fuselage shield 306.

Moreover, for exemplary embodiment depicted, the fuselage shield 306 includes a plurality of layers. Specifically, for the exemplary embodiment depicted, the fuselage shield 306 includes a first/outer layer (e.g., energy distribution layer 316), a second/middle layer (e.g., energy absorption layer 318), and a third/inner layer (e.g., load spreading layer 314). Further, as noted above, the exemplary fuselage shield 306 is removably coupled to the fuselage 302 using a plurality of mechanical fasteners 338. For the exemplary embodiment depicted, the fuselage shield 306 is more specifically removably coupled to the fuselage 302 through the first/outer layer using the mechanical fasteners 338. Notably, the mechanical fasteners 338 further extend through the third/inner layer.

In such a manner, it is noted that the outer layer, the middle layer, and the inner layer may be coupled to one another using mechanical fasteners 338. In addition, for the embodiment depicted, the fuselage shield 306 defines a joint 396 between the outer layer and the inner layer. For the exemplary embodiment depicted, the joint 396 is a weld joint attaching the outer and inner layer to one another, and coupling the fuselage shield 396 together.

However, in other embodiments, the first layer, the middle layer, and a third layer may be coupled to another at least in part using any other suitable means, such as through a mechanical clamp, a resin bondment, a compression wrap, a weld joint, a lamination, or a combination thereof.

Figure 25:
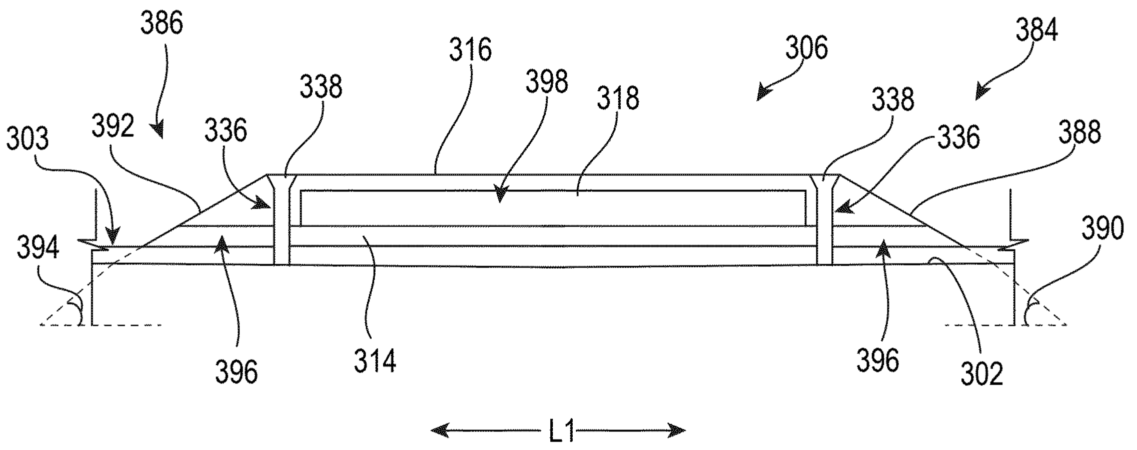
FIG. 25 is a schematic view of the exemplary fuselage shield of FIG. 24.

Referring still to FIG. 25, it will also be appreciated that for the exemplary embodiment depicted, the middle layer is completely enclosed within an interior 398 of the fuselage shield 306. More specifically, for the exemplary embodiment depicted, the middle layer is completely enclosed between the outer layer and the inner layer, the interior 398 defined by the outer layer and the inner layer. More specifically, still, for the exemplary embodiment depicted, the middle layer is hermetically sealed within the interior 398 of the fuselage shield 306, or rather, hermetically seal between the outer layer and the inner layer.

As will be appreciated, having the fuselage shield 306 configured such that the layers are coupled to one another, and further such that a middle layer (e.g., an energy absorption layer 318) is hermetically sealed within an interior of the fuselage shield 306, may further facilitate the fuselage shield 306 being a removable fuselage shield 306. More specifically, one or more of such features may enable the fuselage shield to be installed on an aircraft without requiring additional process steps or integrations with the aircraft to ensure the energy absorption layer 318 is hermetically sealed with respect to an external airflow. For example, such may be desirable when the energy absorption layer 318 defines a relatively low solidity percentage, such that if not hermetically sealed, airflow may flow thereto causing additional drag on the aircraft.

It is noted, however, that in other exemplary embodiments, the fuselage shield 306 may be configured in any other suitable manner, and attached to the fuselage 302 in any other suitable manner. For example, the fuselage shield 306 may not include a plurality of layers (or may have any other suitable configuration of layers. Additionally, or alternatively, the fuselage shield 306 may not be removably coupled to the fuselage 302 of the aircraft 300, and instead may be permanently coupled to the fuselage 302. For example, the fuselage shield 306 may be welded, epoxied, brazed, etc. to the fuselage 302.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7.

In the preceding clause, the P of the unducted fan propulsor is located in a second ellipse having a second major axis length (2 MajAL) and a second minor axis length (2 MinAL) with a second ellipse origin defined by EORL/D of 1.051 and θ of 248.8°, and where 2 MajAL/D is 1.86 and 2 MinAL/D is 1.56.

In any of the preceding clauses, the P of the unducted fan propulsor is located in a third ellipse having a third major axis length (3 MajAL) and a third minor axis length (3 MinAL) with a third ellipse origin defined by EORL/D of 0.870 and θ of 239.6°, where 3 MajAL/D is 1.4 and 3 MinAL/D is 0.9.

In any of the preceding clauses, the P of the unducted fan propulsor is located in a fourth ellipse having a fourth major axis length (4 MajAL) and a fourth minor axis length (4 MinAL) with a fourth ellipse origin defined by EORL/D of 0.763 and θ of 235.7°, and where 4 MajAL/D is 0.94 and 4 MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and θ is between 187° and 340°, and wherein RL/D and θ of the P of the unducted fan propulsor adhere to the following expressions:

$$\frac{RL}{D}+\frac{\left(\sqrt{\begin{array}{l}1.4161*[1.88978*\sin^2(\theta)-0.0875*\\ \cos^2(\theta)+0.477*\sin(\theta)*\cos(\theta)]\end{array}}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{\begin{array}{l}1.4161*[1.88978*\sin^2(\theta)-0.0875*\\ \cos^2(\theta)+0.477*\sin(\theta)*\cos(\theta)]\end{array}}+1.764*\sin(\theta)+0.19146*\cos(\theta)\right)}{1.96*\sin^2(\theta)+0.7225*\cos^2(\theta)}<0.$$

In the preceding clause, 0.254<RL/D<1.86 and θ is between 199° and 306°, and the P of the unducted fan propulsor is defined by the following expressions:

$$\frac{RL}{D}+\frac{\left(\sqrt{\begin{array}{l}0.52621*[0.7205*\sin^2(\theta)-0.352*\\ \cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{array}{l}0.52621*[0.7205*\sin^2(\theta)-0.352*\\ \cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}<0.$$

In any of the two preceding clauses, 0.369<RL/D<1.43 and θ is between 204° and 291°, and the P of the unducted fan propulsor is defined by the following expressions:

$$\frac{RL}{D}+\frac{\left(\sqrt{\begin{array}{l}0.52621*[0.7205*\sin^2(\theta)-0.352*\\ \cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}>0$$

and

-continued $$\frac{RL}{D}+\frac{\left(\sqrt{-0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

In any of the three preceding clauses: 0.477<RL/D<0.9455 and θ is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(\sqrt{-0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

In any of the preceding clauses, 0.15≤RL/D.

In any of the preceding clauses, 0.35≤RL/D, and preferably RL/D is about 0.72.

In any of the preceding clauses, wherein 0 is between 198° and 310°, and preferably between 205° and 285°.

In any of the preceding clauses, the unducted fan propulsor operates at a cruise flight Mach $M_0$ of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $v_o$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein 0.065<RL/D<1.98 and θ is between 187° and 340°; and wherein RL/D and θ of the P of the unducted fan propulsor adhere to the following expressions:

$$\frac{RL}{D}+\frac{\left(\sqrt{\begin{array}{l}1.4161*[1.88978*\sin^2(\theta)-0.0875*\\ \cos^2(\theta)+0.477*\sin(\theta)*\cos(\theta)]\end{array}}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{\begin{array}{l}1.4161*[1.88978*\sin^2(\theta)-0.0875*\\ \cos^2(\theta)+0.477*\sin(\theta)*\cos(\theta)]\end{array}}+1.764*\sin(\theta)+0.19146*\cos(\theta)\right)}{1.96*\sin^2(\theta)+0.7225*\cos^2(\theta)}<0.$$

The aircraft of Clause 6, wherein:

0.254<RL/D<1.86 and @ is between 199° and 306°, and the P of the unducted fan propulsor is defined by the following expressions:

$$\frac{RL}{D}+\frac{\left(\sqrt{\begin{array}{l}0.52621*[0.7205*\sin^2(\theta)-0.352*\\ \cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{array}{l}0.52621*[0.7205*\sin^2(\theta)-0.352*\\ \cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}<0.$$

The aircraft of Clause 6, wherein: 0.369<RL/D<1.43 and θ is between 204° and 291°, and the P of the unducted fan propulsor is defined by the following expressions:

$$\frac{RL}{D}+\frac{\left(\sqrt{\begin{array}{l}0.09923*[0.2964*\sin^2(\theta)-0.36*\\ \cos^2(\theta)+0.66*\sin(\theta)*\cos(\theta)]\end{array}}+0.3675*\sin(\theta)+0.0891*\cos(\theta)\right)}{0.49*\sin^2(\theta)+0.2025*\cos^2(\theta)}>0$$

and $$\frac{RL}{D}+\frac{\left(-\sqrt{\begin{array}{l}0.09923*[0.2964*\sin^2(\theta)-0.36*\\ \cos^2(\theta)+0.66*\sin(\theta)*\cos(\theta)]\end{array}}+0.3675*\sin(\theta)+0.0891*\cos(\theta)\right)}{0.49*\sin^2(\theta)+0.2025*\cos^2(\theta)}<0.$$

The aircraft of Clause 6, wherein: 0.477<RL/D<0.9455 and θ is between 211° and 274°, and the P of the unducted fan propulsor is defined by the following expressions:

$$\frac{RL}{D}+\frac{\left(\sqrt{\begin{array}{l}0.01069156*[0.036*\sin^2(\theta)-0.3485*\\ \cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{\begin{array}{l}0.01069156*[0.036*\sin^2(\theta)-0.3485*\\ \cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}<0.$$

The aircraft of Clause 6, wherein the unducted fan propulsor is undermounted to the airfoil with one or more intermediate structures.

The aircraft of Clause 6, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of Clause 7, wherein 0.15≤RL/D.

The aircraft of Clause 7, wherein 0.35≤RL/D, and preferably RL/D is about 0.72.

The aircraft of Clause 7, wherein 0 is between 198° and 310°, and preferably between 205° and 285°.

The aircraft of Clause 7, wherein the unducted fan propulsor operates at a cruise flight Mach $M_0$ of between 0.5 and 0.9, preferably between 0.7 and 0.9, and more preferably between 0.75 and 0.9.

The aircraft of Clause 7, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $v_o$ is cruise flight velocity, and $A_{an}$ is annular cross-sectional area perpendicular to an axis of rotation of a rotor axis of rotation.

The aircraft of Clause 7, wherein the unducted fan propulsor is undermounted to the airfoil with one or more intermediate structures.

The aircraft of Clause 7, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein 0.07≤RL/D≤2.0 and θ is between 187° and 342.°.

The method of Clause 8, wherein 0.15≤RL/D.

The method of Clause 8, wherein 0.35≤RL/D, and preferably RL/D is about 0.72.

The method of Clause 8, wherein 0 is between 198° and 310°, and preferably between 205° and 285°.

The method of Clause 8, wherein the unducted fan propulsor operates at a cruise flight Mach $M_0$ of between 0.5 and 0.9, preferably between 0.7 and 0.9, and more preferably between 0.75 and 0.9.

The method of Clause 8, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $v_o$ is cruise flight velocity, and $A_{an}$ is annular cross-sectional area perpendicular to an axis of rotation of a rotor axis of rotation.

The method of Clause 8, wherein the unducted fan propulsor is undermounted to the airfoil with one or more intermediate structures.

The method of Clause 8, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7.

The method of Clause 9, wherein the P of the unducted fan propulsor is located in a second ellipse having a second major axis length (2 MajAL) and a second minor axis length (2 MinAL) with a second ellipse origin defined by EORL/D of 1.051 and θ of 248.8°, and where 2 MajAL/D is 1.86 and 2 MinAL/D is 1.56.

The method of Clause 9, wherein the P of the unducted fan propulsor is located in a third ellipse having a third major axis length (3 MajAL) and a third minor axis length (3 MinAL) with a third ellipse origin defined by EORL/D of 0.870 and θ of 239.6°, where 3 MajAL/D is 1.4 and 3 MinAL/D is 0.9.

The method of Clause 9, wherein the P of the unducted fan propulsor is located in a fourth ellipse having a fourth major axis length (4 MajAL) and a fourth minor axis length (4 MinAL) with a fourth ellipse origin defined by EORL/D of 0.763 and θ of 235.7°, and where 4 MajAL/D is 0.94 and 4 MinAL/D is 0.44.

Clause 10: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

Clause 11: An aircraft comprising:

a fuselage;

a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing; wherein 0.07≤RL/D≤2.0 and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

An aircraft defining a longitudinal direction and a lateral direction, the aircraft comprising: a fuselage; a unducted fan propulsor mounted at a location spaced from the fuselage of the aircraft, the unducted fan propulsor comprising an unducted rotor assembly having a single stage of rotor blades; and a fuselage shield attached to or formed integrally with the fuselage at a location in alignment with the single stage of rotor blades of the unducted rotor assembly along the lateral direction.

The aircraft of one or more of these clauses, further comprising: a wing extending from the fuselage generally along the lateral direction, wherein the unducted fan propulsor is mounted to the wing.

The aircraft of one or more of these clauses, wherein the unducted fan propulsor is a first unducted fan propulsor, wherein the fuselage shield is a first fuselage shield attached to or formed integrally with a first side of the fuselage, and wherein the aircraft further comprises: a second unducted fan propulsor comprising an unducted rotor assembly having a single stage of rotor blades; a first wing extending from the first side of the fuselage generally along the lateral direction, wherein the first unducted fan propulsor is mounted to the first wing; a second wing extending from a second side of the fuselage generally along the lateral direction, wherein the second unducted fan propulsor is mounted to the second wing; and a second fuselage shield attached to or formed integrally with the second side of the fuselage at a second location in alignment with the single stage of rotor blades of the second unducted rotor assembly along the lateral direction.

The aircraft of one or more of these clauses, wherein the first fuselage shield is positioned asymmetrically to the second fuselage shield relative to a reference plane extending along the longitudinal direction and a vertical direction through a center of the aircraft.

The aircraft of one or more of these clauses, wherein the rotor assembly of the first unducted fan propulsor and the rotor assembly of the second unducted fan propulsor each rotate in the same rotational direction, and wherein the first fuselage shield extends higher than the second fuselage shield along the vertical direction or lower than the second fuselage shield along the vertical direction.

The aircraft of one or more of these clauses, wherein the first fuselage shield defines a first absolute positioning angle relative to a top of a vertical reference line extending through a center of the fuselage, wherein the second fuselage shield defines a second absolute positioning angle relative to the top of the vertical reference line, wherein a difference between the first absolute positioning angle and the second absolute positioning angle is greater than 5 degrees and less than fifty degrees.

The aircraft of one or more of these clauses, wherein the fuselage shield defines a top end and a bottom end along a vertical direction of the aircraft, wherein the fuselage shield defines a coverage span angle between the top end and the bottom end as measured from a center of the fuselage of at least 45 degrees and up to about 180 degrees.

The aircraft of one or more of these clauses, wherein the fuselage shield comprises a first zone having a first impact resistance and a second zone having a second impact resistance, wherein the first zone and second zone are arranged along a circumference of the fuselage.

The aircraft of one or more of these clauses, wherein the fuselage shield further comprises a third zone having a third impact resistance, wherein the second zone and third zone are arranged on opposing sides of the first zone along the circumference of the fuselage, and wherein the first impact resistance is greater than the second impact resistance and greater than the third impact resistance.

The aircraft of one or more of these clauses, wherein the fuselage shield comprises a plurality of zones arranged along a circumference of the fuselage, wherein an impact resistance of the fuselage shield varies between each of the adjacent zones.

The aircraft of one or more of these clauses, wherein a thickness of the fuselage shield varies between each of the adjacent zones.

The aircraft of one or more of these clauses, wherein the plurality of zones includes at least 4 zones and up to 10 zones.

The aircraft of one or more of these clauses, wherein the fuselage shield defines a surface area between 720 square inches and 15,000 square inches.

A fuselage shield assembly for use with a fuselage of an aircraft having a unducted fan propulsor, the aircraft defining a longitudinal direction and a lateral direction, the fuselage shield assembly comprising: a body configured to be attached to or formed integrally with the fuselage of the aircraft at a location in alignment with the unducted fan propulsor along the lateral direction, body comprising a plurality of zones configured to be arranged along a circumference of the fuselage when coupled to the fuselage of the aircraft, wherein an impact resistance of the fuselage shield varies between each of the adjacent zones.

The fuselage shield assembly of one or more of these clauses, wherein the plurality of zones includes a first zone having a first impact resistance and a second zone having a second impact resistance, wherein the first zone and second zone are configured to be arranged along a circumference of the fuselage.

The fuselage shield assembly of one or more of these clauses, wherein the fuselage shield further comprises a third zone having a third impact resistance, wherein the second zone and third zone are arranged on opposing sides of the first zone, and wherein the first impact resistance is greater than the second impact resistance and greater than the third impact resistance.

The fuselage shield assembly of one or more of these clauses, wherein a thickness of the fuselage shield varies between each of the adjacent zones.

The fuselage shield assembly of one or more of these clauses, wherein the plurality of zones includes at least 4 zones and up to 10 zones.

The fuselage shield assembly of one or more of these clauses, wherein the fuselage shield defines a surface area between 720 square inches and 15,000 square inches.

The fuselage shield assembly of one or more of these clauses, wherein the body of the fuselage shield assembly defines a top end and a bottom end along a vertical direction of the aircraft when coupled to the fuselage of the aircraft, wherein the body defines a coverage span angle between the top end and the bottom end as measured from a center of the fuselage of at least 45 degrees and up to about 180 degrees when coupled to the fuselage of the aircraft.

An aircraft defining a longitudinal direction and a lateral direction, the aircraft comprising: a fuselage; an unducted rotor engine mounted at a location spaced from the fuselage of the aircraft, the unducted rotor engine comprising an unducted rotor assembly having a stage of unducted rotor blades; and a fuselage shield removably coupled to the fuselage at a location in alignment with the stage of rotor blades of the unducted rotor assembly along the lateral direction.

The aircraft of one or more of these clauses, wherein the fuselage shield is removably coupled to the fuselage using a plurality of mechanical fasteners.

The aircraft of one or more of these clauses, wherein the fuselage shield defines a perimeter, and wherein the fuselage shield is removably coupled to the fuselage with a plurality of fasteners arranged in a density of at least one fastener per inch and up to 25 fasteners per inch.

The aircraft of one or more of these clauses, wherein the fuselage shield defines a forward end and an aft end, wherein the forward end defines a forward end taper angle of at least 1 degree and up to 15 degrees.

The aircraft of one or more of these clauses, wherein the forward end taper angle of the forward end is less than or equal to 7 degrees.

The aircraft of one or more of these clauses, wherein the aft end defines an aft end taper angle of at least 1 degree and up to 15 degrees.

The aircraft of one or more of these clauses, wherein the fuselage shield comprises a first layer and a second layer.

The aircraft of one or more of these clauses, wherein the second layer is hermetically sealed within an interior of the fuselage shield.

The aircraft of one or more of these clauses, wherein the fuselage shield is removably coupled to the fuselage through the first layer.

The aircraft of one or more of these clauses, wherein the first layer is an energy distribution layer, wherein the second layer is an energy absorption layer.

The aircraft of one or more of these clauses, wherein the unducted rotor engine is a unducted fan propulsor, and wherein the unducted rotor assembly and the stage of unducted rotor blades are a single unducted rotor assembly and a single stage of unducted rotor blades, respectively.

The aircraft of one or more of these clauses, wherein the fuselage shield defines a surface area between 720 square inches and 15,000 square inches.

The aircraft of one or more of these clauses, wherein the fuselage shield assembly defines a top end and a bottom end along a vertical direction of the aircraft, wherein the fuselage shield defines a coverage span angle between the top end and the bottom end as measured from a center of the fuselage of at least 45 degrees and up to about 180 degrees.

An aircraft defining a longitudinal direction and a lateral direction, the aircraft comprising: a fuselage; an unducted rotor engine mounted at a location spaced from the fuselage of the aircraft, the unducted rotor engine comprising an unducted rotor assembly having a stage of unducted rotor blades; and a fuselage shield attached to or formed integrally with the fuselage at a location in alignment with the single stage of rotor blades of the unducted rotor assembly along the lateral direction, the fuselage shield comprising a first layer defining a first density and a second layer defining a second density, the first density being different than the second density.

The aircraft of one or more of these clauses, wherein a thickness of the first layer is different than a thickness of the second layer.

The aircraft of one or more of these clauses, wherein the first layer is an energy distribution layer, and wherein the second layer is an energy absorption layer.

The aircraft of one or more of these clauses, wherein the thickness of the first layer is at least 0.05 inches and up to 2.5 inches, and wherein the thickness of the second layer is at least 0.25 inches and up to 4 inches.

The aircraft of one or more of these clauses, further comprising a third layer, wherein the third layer is a load spreading layer, and wherein a thickness of the third layer is at least 0.05 inches and up to 2.5 inches.

The aircraft of one or more of these clauses, wherein the first layer is formed of a Kevlar, a metal, a carbon fiber composite, a ceramic, or a combination thereof, and wherein the second layer comprises a honeycomb structure, a lattice structure, a foam material, a polyurethane material, or a combination thereof.

The aircraft of one or more of these clauses, wherein the first density is greater than the second density.

The aircraft of one or more of these clauses, wherein the first density is at least about 100% greater than the second density.

The aircraft of one or more of these clauses, wherein the energy distribution layer is positioned closer to the stage of unducted rotor blades than the energy absorption layer.

The aircraft of one or more of these clauses, wherein the fuselage shield further comprises a load spreading layer defining a third density, wherein the third density is greater than the first density.

The aircraft of one or more of these clauses, wherein the energy distribution layer is positioned closer to the stage of unducted rotor blades than the energy absorption layer, and wherein the energy absorption layer is positioned closer to the stage of unducted rotor blades than the load spreading layer.

The aircraft of one or more of these clauses, wherein the second layer is hermetically sealed within an interior of the fuselage shield.

The aircraft of one or more of these clauses, wherein the fuselage shield is coupled to the fuselage through the first layer.

The aircraft of one or more of these clauses, wherein the first layer and the second layer are secured to one another at least in part using a mechanical clamp, a resin bondment, a compression wrap, a weld joint, a lamination, or a combination thereof.

The aircraft of one or more of these clauses, wherein the first layer is an energy distribution layer, wherein the second layer is an energy absorption layer, and wherein the second layer is formed of a plurality of sheets and plurality of spacers positioned between adjacent sheets of the plurality of sheets.

A fuselage shield assembly for use with a fuselage of an aircraft having an unducted rotor engine, the aircraft defining a longitudinal direction and a lateral direction, the fuselage shield assembly comprising: a body formed of a plurality of layers configured to be attached to or formed integrally with the fuselage of the aircraft at a location in alignment with the unducted rotor engine along the lateral direction, the plurality of layers comprising a first layer and a second layer, the first layer defining a first density and the second layer defining a second density, the first density being different than the second density.

The fuselage shield assembly of one or more of these clauses, wherein the first layer is an energy distribution layer, wherein the second layer is an energy absorption layer, and wherein the first density is greater than the second density.

The fuselage shield assembly of one or more of these clauses, wherein the first density is at least about 100% greater than the second density.

The fuselage shield assembly of one or more of these clauses, wherein the energy distribution layer is configured to be positioned closer to the unducted rotor engine than the energy absorption layer.

The fuselage shield assembly of one or more of these clauses, wherein the fuselage shield further comprises a load spreading layer defining a third density, wherein the third density is greater than the first density, wherein the energy distribution layer is configured to be positioned closer to the unducted rotor engine than the energy absorption layer, and wherein the energy absorption layer is configured to be positioned closer to the unducted rotor engine than the load spreading layer.

An aircraft defining a longitudinal direction and a lateral direction, the aircraft comprising: a fuselage; an engine mounted at a location spaced from the fuselage of the aircraft, the engine comprising rotor blades; and at least one fuselage shield removably coupled to the fuselage at a location in alignment with the rotor blades along the lateral direction.

The aircraft of one or more of these clauses, wherein the aircraft is a narrow body aircraft or a wide body aircraft.

The aircraft of one or more of these clauses, wherein the fuselage of the aircraft defines a width along a lateral direction of at least 80 inches, such as at least 90 inches, such as at least 100 inches, such as at least 110 inches, such as at least 130 inches.

The aircraft of one or more of these clauses, wherein the fuselage of the aircraft defines a width along a lateral direction of up to 400 inches, or up to 350 inches, or up to 300 inches.

The aircraft of one or more of these clauses, wherein the plurality of rotor blades defines a diameter of at least six feet, such as at least eight feet, such as at least ten feet, such as at least twelve feet.

The aircraft of one or more of these clauses, wherein the plurality of rotor blades defines a diameter of up to 22 feet.

The aircraft of one or more of these clauses configured to carry more than 100 passengers.

The aircraft of one or more of these clauses configured to carry more than 150 passengers.

The aircraft of one or more of these clauses configured to carry less than 600 passengers.

The aircraft of one or more of these clauses having a cruise speed between Mach 0.5 and Mach 0.85.

The aircraft of one or more of these clauses having a cruise speed between Mach 0.75 and Mach 0.85.

The aircraft of one or more of these clauses having a cruise altitude between 28,000 feet and 65,000 feet.

The aircraft of one or more of these clauses having a cruise altitude between 28,000 feet and 45,000 feet.

The aircraft of one or more of these clauses having a cruise altitude approximately 4.85 psia and approximately 0.82 psia based on a sea level pressure of approximately 14.70 psia and sea level temperature at approximately 59 degree Fahrenheit.

The aircraft of one or more of these clauses having a cruise altitude approximately 4.85 psia and approximately 2.14 psia based on a sea level pressure of approximately 14.70 psia and sea level temperature at approximately 59 degree Fahrenheit.

An aircraft of one or more of these clauses incorporating a fuselage shield assembly of one or more of these clauses.

A fuselage shield assembly of one or more of these clauses incorporated into an aircraft of one or more of these clauses.

An aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC; a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein $0.07 \leq RL/D \leq 2.0$ and θ is between 187° and 342°; and a fuselage shield attached to or formed integrally with the fuselage.

The aircraft of one or more of these clauses, wherein the aircraft defines a lateral direction, wherein the fuselage shield attached to or formed integrally with the fuselage at a location in alignment with the rotating blades of the unducted fan propulsor along the lateral direction.

The aircraft of one or more of these clauses, wherein the rotating blades are formed substantially of a composite material.

The aircraft of one or more of these clauses, wherein the fuselage shield comprises: a body configured to be attached to or formed integrally with the fuselage of the aircraft, the body comprising a plurality of zones arranged along a circumference of the fuselage.

The aircraft of one or more of these clauses, wherein an impact resistance of the fuselage shield varies between each of the adjacent zones.

The aircraft of one or more of these clauses, wherein the fuselage shield is removably coupled to the fuselage.

The aircraft of one or more of these clauses, wherein the aircraft defines a lateral direction, wherein the fuselage shield is removably coupled to the fuselage at a location in alignment with the rotating blades of the unducted fan propulsor along the lateral direction.

The aircraft of one or more of these clauses, wherein the fuselage shield comprises a first layer defining a first density and a second layer defining a second density, the first density being different than the second density.

The aircraft of one or more of these clauses, wherein the first layer is an energy distribution layer, wherein the second layer is an energy absorption layer, and wherein the first density is greater than the second density.

The aircraft of one or more of these clauses, wherein $0.15 \leq RL/D$.

The aircraft of one or more of these clauses, wherein $0.35 \leq RL/D$, and preferably RL/D is about 0.72.

The aircraft of one or more of these clauses, wherein 0 is between 198° and 310°, and preferably between 205° and 285°.

The aircraft of one or more of these clauses, wherein the two or more unducted fan propulsors are configured to operate at a cruise flight Mach M0 of between 0.7 and 0.9, and more preferably between 0.75 and 0.9; or the two or more unducted fan propulsors are configured to propel the aircraft at a cruise flight Mach M0 of between 0.7 and 0.9, and more preferably between 0.75 and 0.85.

The aircraft of one or more of these clauses, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $v_o$ is cruise flight velocity, and $A_{an}$ is annular cross-sectional area perpendicular to an axis of rotation of a rotor axis of rotation.

The aircraft of one or more of these clauses, wherein the unducted fan propulsor is undermounted to the airfoil with one or more intermediate structures.

The aircraft of one or more of these clauses, wherein the P of the unducted fan propulsor is variable to accommodate different operating conditions.

An aircraft, comprising: a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7; and a fuselage shield attached to or formed integrally with the fuselage.

The aircraft of one or more of these clauses, wherein the P of the unducted fan propulsor is located in a second ellipse having a second major axis length (2 MajAL) and a second minor axis length (2 MinAL) with a second ellipse origin defined by EORL/D of 1.051 and θ of 248.8°, and where 2 MajAL/D is 1.86 and 2 MinAL/D is 1.56.

The aircraft of one or more of these clauses, wherein the P of the unducted fan propulsor is located in a third ellipse having a third major axis length (3 MajAL) and a third minor axis length (3 MinAL) with a third ellipse origin defined by EORL/D of 0.870 and θ of 239.6°, where 3 MajAL/D is 1.4 and 3 MinAL/D is 0.9.

The aircraft of one or more of these clauses, wherein the P of the unducted fan propulsor is located in a fourth ellipse having a fourth major axis length (4 MajAL) and a fourth minor axis length (4 MinAL) with a fourth ellipse origin defined by EORL/D of 0.763 and θ of 235.7°, and where 4 MajAL/D is 0.94 and 4 MinAL/D is 0.44.

An aircraft, comprising: a fuselage; an airfoil extending from the fuselage, the airfoil having an airfoil section defining an effective quarter-chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D}+\frac{\left(\sqrt{\begin{array}{l}1.4161*\left[1.88978*\sin^2(\theta)-0.0875*\right.\\ \left.\cos^2(\theta)+0.477*\sin(\theta)*\cos(\theta)\right]\end{array}}+1.764*\sin(\theta)+0.19146*\cos(\theta)\right)}{1.96*\sin^2(\theta)+0.7225*\cos^2(\theta)}>0;\text{ and}$$

$$\frac{RL}{D}+\frac{\left(-\sqrt{\begin{array}{l}1.4161*\left[1.88978*\sin^2(\theta)-0.0875*\right.\\ \left.\cos^2(\theta)+0.477*\sin(\theta)*\cos(\theta)\right]\end{array}}+1.764*\sin(\theta)+0.19146*\cos(\theta)\right)}{1.96*\sin^2(\theta)+0.7225*\cos^2(\theta)}<0$$

and a fuselage shield attached to or formed integrally with the fuselage.

The aircraft of one or more of these clauses, wherein a circumferential position of the fuselage shield on the fuselage corresponds to the angle θ of the unducted fan propulsor relative to the airfoil section.

The aircraft of one or more of these clauses, wherein the aircraft defines a vertical direction, and wherein the fuselage shield on the fuselage is oriented in a mounting angle not equal to 0 degrees relative to the vertical direction.

The aircraft of one or more of these clauses, wherein the aircraft defines a vertical direction, and wherein the fuselage shield on the fuselage is oriented in a mounting angle not equal to 0 degrees relative to the vertical direction, corresponding to the angle θ of the unducted fan propulsor relative to the airfoil section.

The aircraft of one or more of these clauses, wherein the mounting angle is equal to the angle θ of the unducted fan propulsor relative to the airfoil section, plus or minus 30 degrees.

The aircraft of one or more of these clauses, wherein the unducted fan propulsor has an inward toe angle of between 0 and 5 degrees, or 1 and 3 degrees, wherein the aircraft defines a vertical direction, and wherein the fuselage shield on the fuselage is oriented in a mounting angle not equal to 0 degrees relative to the vertical direction, corresponding to the toe angle of the unducted fan propulsor.

The invention claimed is:

1. An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°; and a fuselage shield attached to or formed integrally with the fuselage.

2. The aircraft of claim 1, wherein the aircraft defines a lateral direction, wherein the fuselage shield attached to or formed integrally with the fuselage at a location in alignment with the rotating blades of the unducted fan propulsor along the lateral direction.

3. The aircraft of claim 1, wherein the fuselage shield comprises:

a body configured to be attached to or formed integrally with the fuselage of the aircraft, the body comprising a plurality of zones arranged along a circumference of the fuselage.

4. The aircraft of claim 3, wherein an impact resistance of the fuselage shield varies between each of the adjacent zones.

5. The aircraft of claim 1, wherein the fuselage shield is removably coupled to the fuselage.

6. The aircraft of claim 5, wherein the aircraft defines a lateral direction, wherein the fuselage shield is removably coupled to the fuselage at a location in alignment with the rotating blades of the unducted fan propulsor along the lateral direction.

7. The aircraft of claim 1, wherein the fuselage shield comprises a first layer defining a first density and a second layer defining a second density, the first density being different than the second density.

8. The aircraft of claim 7, wherein the first layer is an energy distribution layer, wherein the second layer is an energy absorption layer, and wherein the first density is greater than the second density.

9. The aircraft of claim 1, wherein 0.15≤RL/D.

10. The aircraft of claim 1, wherein 0.35≤RL/D, and preferably RL/D is about 0.72.

11. The aircraft of claim 1, wherein 0 is between 198° and 310°, and preferably between 205° and 285°.

12. The aircraft of claim 1, wherein the two or more unducted fan propulsors are configured to operate at a cruise flight Mach M0 of between 0.7 and 0.9, and more preferably between 0.75 and 0.9; or the two or more unducted fan propulsors are configured to propel the aircraft at a cruise flight Mach M0 of between 0.7 and 0.9, and more preferably between 0.75 and 0.85.

13. The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

14. The aircraft of claim 1, wherein a circumferential position of the fuselage shield on the fuselage corresponds to the angle θ of the unducted fan propulsor relative to the airfoil section.

15. The aircraft of claim 1, wherein the aircraft defines a vertical direction, and wherein the fuselage shield on the fuselage is oriented in a mounting angle not equal to 0 degrees relative to the vertical direction, corresponding to the angle θ of the unducted fan propulsor relative to the airfoil section.

16. An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7; and a fuselage shield attached to or formed integrally with the fuselage.

17. The aircraft of claim 16, wherein the P of the unducted fan propulsor is located in a second ellipse having a second major axis length (2 MajAL) and a second minor axis length (2 MinAL) with a second ellipse origin defined by EORL/D of 1.051 and θ of 248.8°, and where 2 MajAL/D is 1.86 and 2 MinAL/D is 1.56.

18. The aircraft of claim 16, wherein the P of the unducted fan propulsor is located in a third ellipse having a third major axis length (3 MajAL) and a third minor axis length (3 MinAL) with a third ellipse origin defined by EORL/D of 0.870 and θ of 239.6°, where 3 MajAL/D is 1.4 and 3 MinAL/D is 0.9.

19. The aircraft of claim 16, wherein the P of the unducted fan propulsor is located in a fourth ellipse having a fourth major axis length (4 MajAL) and a fourth minor axis length (4 MinAL) with a fourth ellipse origin defined by EORL/D of 0.763 and θ of 235.7°, and where 4 MajAL/D is 0.94 and 4 MinAL/D is 0.44.

20. An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D}+\frac{\left(\sqrt{\begin{array}{l}1.4161*[1.88978*\sin^2(\theta)-0.0875*\\ \quad\cos^2(\theta)+0.477*\sin(\theta)*\cos(\theta)]\end{array}}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{\begin{array}{l}1.4161*[1.88978*\sin^2(\theta)-0.0875*\\ \quad\cos^2(\theta)+0.477*\sin(\theta)*\cos(\theta)]\end{array}}+1.764*\sin(\theta)+0.19146*\cos(\theta)\right)}{1.96*\sin^2(\theta)+0.7225*\cos^2(\theta)}<0;\text{ and}$$

a fuselage shield attached to or formed integrally with the fuselage.

* * * * *